(12) United States Patent
Buckley et al.

(10) Patent No.: US 11,477,735 B2
(45) Date of Patent: Oct. 18, 2022

(54) INCREASING BATTERY PERFORMANCE FOR A DEVICE THAT USES POWER SAVING FEATURES

(71) Applicant: BlackBerry Limited, Waterloo (CA)

(72) Inventors: Adrian Buckley, Tracy, CA (US); Jan Hendrik Lucas Bakker, Fort Worth, TX (US)

(73) Assignee: BlackBerry Limited, Waterloo (CA)

( * ) Notice: Subject to any disclaimer, the term of this patent is extended or adjusted under 35 U.S.C. 154(b) by 156 days.

(21) Appl. No.: 17/045,721

(22) PCT Filed: Apr. 5, 2019

(86) PCT No.: PCT/EP2019/058595
§ 371 (c)(1),
(2) Date: Oct. 6, 2020

(87) PCT Pub. No.: WO2019/193133
PCT Pub. Date: Oct. 10, 2019

(65) Prior Publication Data
US 2021/0368446 A1    Nov. 25, 2021

Related U.S. Application Data

(60) Provisional application No. 62/654,086, filed on Apr. 6, 2018.

(51) Int. Cl.
*H04W 52/02* (2009.01)
*H04W 60/04* (2009.01)
*H04W 68/00* (2009.01)

(52) U.S. Cl.
CPC ... *H04W 52/0235* (2013.01); *H04W 52/0216* (2013.01); *H04W 60/04* (2013.01); *H04W 68/005* (2013.01)

(58) Field of Classification Search
CPC ......... H04W 52/0235; H04W 52/0216; H04W 60/04; H04W 68/005; H04W 52/02; H04W 52/0209; H04W 52/00
See application file for complete search history.

(56) References Cited

U.S. PATENT DOCUMENTS 6,679,102 B2    1/2004   Baker
10,200,841 B2   2/2019   Buckley et al.
(Continued)

FOREIGN PATENT DOCUMENTS

CN    102083048 A    6/2011
CN    102265119 A    11/2011
(Continued)

OTHER PUBLICATIONS

3GPP TS 23.040 V12.2.0; 3rd Generation Partnership Project; Technical Specification Group Core Network and Terminals; Technical Realization of the Short Message Service (SMS); Release 12; Dec. 2013; 209 pages.
(Continued)

*Primary Examiner* — Ian N Moore
*Assistant Examiner* — Latresa A McCallum
(74) *Attorney, Agent, or Firm* — Conley Rose, P. C.; J. Robert Brown, Jr.

(57) ABSTRACT

Described herein are systems and methods to increase battery life of a user equipment (UE) by reducing the amount of time a UE spends in active time listening for paging messages following mobile originate (MO) or mobile terminated (MT) data transfers. A network node may receive, from a UE, a message including an identifier of the UE and a request to set the duration of an active time timer to zero. The network node may determine whether any MT traffic is available for the UE, and send a message to the UE including the duration of the active time timer or some other indicator
(Continued)

400

4.5.4 UE Power Saving Mode

When the UE wants to use the PSM it shall request an Active Time value during every Attach and TAU/RAU procedures. If the network supports PSM and accepts that the UE uses PSM, the network confirms usage of PSM by allocating an Active Time value to the UE. The network takes the UE requested value, the Maximum Response Time (defined in clause 5.6.1.4), if provided with the Insert Subscriber Data message from HSS, Message Waiting Indication (MWI) (defined in 3GPP TS 23.040) and any local MME/SGSN configuration into account for determining the Active Time value that is allocated to the UE. If the UE wants to change the Active Time value, e.g. when the conditions are changed in the UE, the UE consequently requests the value it wants in the TAU/RAU procedure.

NOTE 2:  The minimum recommended length for the Active Time is the time allowing for the 'msg waiting flag' in the MME/SGSN to trigger the SMSC via the HSS to deliver an SMS to the MME/SGSN, e.g. 2 DRX cycles plus 10 seconds.

NOTE 3:  The Maximum Response Time value can be configured as desired Active Time value in the HSS via O&M.

NOTE 4:  If MWI for the UE is not set, then the Active Timer could be set to 0 seconds.

to indicate to the UE whether or not MT data is awaiting transmission.

18 Claims, 53 Drawing Sheets

(56) References Cited

U.S. PATENT DOCUMENTS

| | | | |
|---|---|---|---|
| 10,560,828 B2 | 2/2020 | Buckley et al. | |
| 10,979,880 B2 | 4/2021 | Buckley et al. | |
| 2002/0159569 A1 | 10/2002 | Hasegawa | |
| 2005/0050148 A1 | 3/2005 | Mohammadioun et al. | |
| 2006/0285527 A1* | 12/2006 | Gao | H04W 52/0216 370/338 |
| 2007/0155390 A1 | 7/2007 | Kodikara Patabandi et al. | |
| 2011/0085535 A1 | 4/2011 | Shaheen | |
| 2012/0005731 A1 | 1/2012 | Lei et al. | |
| 2012/0087274 A1 | 4/2012 | Meriau | |
| 2012/0189016 A1* | 7/2012 | Bakker | H04W 76/11 370/401 |
| 2013/0080597 A1 | 3/2013 | Liao | |
| 2013/0083726 A1 | 4/2013 | Jain et al. | |
| 2013/0143610 A1 | 6/2013 | Jeong et al. | |
| 2013/0268604 A1 | 10/2013 | Gupta et al. | |
| 2014/0004890 A1 | 1/2014 | Cai et al. | |
| 2014/0153434 A1* | 6/2014 | Kokovidis | H04W 48/16 370/252 |
| 2014/0241241 A1 | 8/2014 | Liu | |
| 2015/0109966 A1 | 4/2015 | Hong et al. | |
| 2015/0327170 A1* | 11/2015 | Kim | H04W 52/0212 455/574 |
| 2016/0205625 A1* | 7/2016 | Stojanovski | H04W 76/27 370/311 |
| 2016/0295504 A1* | 10/2016 | Wang | H04W 68/02 |
| 2017/0048112 A1 | 2/2017 | Ronneke et al. | |
| 2017/0048684 A1 | 2/2017 | Ronneke et al. | |
| 2017/0064487 A1 | 3/2017 | Buckley et al. | |
| 2017/0164286 A1* | 6/2017 | Jeong | H04W 52/0258 |

FOREIGN PATENT DOCUMENTS

| | | | | |
|---|---|---|---|---|
| CN | 103858452 A | 6/2014 | | |
| EP | 2615421 A1 | 7/2013 | | |
| WO | 2013051826 A2 | 4/2013 | | |
| WO | 2015199319 A1 | 12/2015 | | |
| WO | WO-2016147752 A1 * | 9/2016 | | G01J 1/02 |
| WO | WO-2019032012 A1 * | 2/2019 | | H04W 52/0216 |

OTHER PUBLICATIONS

3GPP TS 23.060 V9.3.0; 3rd Generation Partnership Project; Technical Specification Group Services and System Aspects, General Packet Radio Service (GPRS); Service Description; Stage 2; Release 9; Dec. 2009; 295 pages.
3GPP TR 23.720 V0.1.0; 3rd Generation Partnership Project; Technical Specification Group Services and System Aspects; Architecture Enhancements for Cellular Internet of Things; Release 13; Jul. 2015; 54 pages.
3GPP TR 23.720 V13.0.0; 3rd Generation Partnership Project; Technical Specification Group Services and System Aspects; Study on Architecture Enhancements for Cellular Internet of Things; Release 13; Mar. 2016; 78 pages.
3GPP TR 23.888 V11.0.0; 3rd Generation Partnership Project; Techincal Specification Group Services and System Aspects; System Improvements for Machine-Type Communications (MTC); Release 11; Sep. 2012; 166 pages.
Office Action dated Nov. 29, 2016; U.S. Appl. No. 14/834,216, filed Aug. 24, 2015; 13 pages.
Notice of Allowance dated May 22, 2017; U.S. Appl. No. 14/834,216, filed Aug. 24, 2015; 11 pages.
Office Action dated Dec. 12, 2017; U.S. Appl. No. 15/679,927, filed Aug. 17, 2017; 16 pages.
Final Office Action dated May 2, 2018; U.S. Appl. No. 15/679,927, filed Aug. 17, 2017; 10 pages.
Advisory Action dated Jul. 5, 2018; U.S. Appl. No. 15/679,927, filed Aug. 17, 2017; 3 pages.
Notice of Allowance dated Sep. 21, 2018; U.S. Appl. No. 15/679,927, filed Aug. 17, 2017; 8 pages.
Office Action dated Jun. 13, 2019; U.S. Appl. No. 16/266,421, filed Feb. 4, 2019; 9 pages.
Notice of Allowance dated Sep. 20, 2019; U.S. Appl. No. 16/266,421, filed Feb. 4, 2019; 7 pages.
Office Action dated Apr. 2, 2020; U.S. Appl. No. 16/745,276, filed Jan. 16, 2020; 13 pages.
Notice of Allowance dated Jul. 7, 2020; U.S. Appl. No. 16/745,276, filed Jan. 16, 2020; 5 pages.
PCT International Search Report and PCT Written Opinion of the International Searching Authority; Application No. PCT/EP2016/069692; dated Dec. 22, 2016; 12 pages.
Chinese Office Action; Application No. 201680062260.9; dated Nov. 3, 2020; 26 pages.
Chinese Office Action; Application No. 201680062260.9; dated Jun. 15, 2021; 15 pages.
European Examination Report; Application No. 16753920.4; dated Nov. 26, 2020; 7 pages.
Japanese Office Action; Application No. 2018-510501; dated Sep. 2, 2016; 5 pages.
3GPP TSG CT WG1 Meeting #108; "Discussion on Periodic TAU & PSM Setting Changes"; C1-180285; Gothenburg (Sweden); Jan. 22-26, 2018; 3 pages.
3GPP TSG-RAN WG2 #99; "eMTC Power Consumption Reduction for Paging and Connected-Mode DRX"; R2-1708285; Berlin, Germany; Aug. 21-25, 2017; 8 pages.
SA WG2 Meeting #126; "Solution for KI4 Track 2: Power Saving Functions"; S2-181827; Montreal, Canada; Feb. 26-Mar. 2, 2018; 4 pages.
SA WG2 Meeting #126; "PCR 23.724: Power Saving Mode"; S2-181907; Montreal, Canada; Feb. 26-Mar. 2, 2018; 3 pages.
3GPP TSG-SA WG2 Meeting #126; "Solution for Key Issue #4: MICO Mode Enhanced with Active Timer"; S2-181959; Montreal, Canada; Feb. 26-Mar. 2, 2018; 4 pages.
PCT International Search Report and PCT Written Opinion of the International Searching Authority; Application No. PCT/EP2019/058595; dated Jun. 13, 2019; 17 pages.
European Examination Report; Application No. 16753920.4; dated Mar. 2, 2022; 6 pages.
Sierra Wireless; "3GPP LPWA Standards: LTE-M, NB-Iot & EC-GSM"; LPWA Roadshow; Melbourne; Sep. 14, 2017; 28 pages.
3GPP TS 24.302 V15.1.0; 3rd Generation Partnership Project; Technical Specification Group Core Network and Terminals; Access to the 3GPP Evolved Packet Core (EPC) via non-3GPP Access Networks; Stage 3; Release 15; Dec. 2017; 171 pages.
3GPP TS 23.682 V15.3.0; 3rd Generation Partnership Project; Technical Specification Group Services and System Aspects; Architecture Enhancements to Facilitate Communications with Packet Data Networks and Applications; Release 15; Dec. 2017; 123 pages.
3GPP Ts 24.008 V15.1.0; 3rd Generation Partnership Project; Technical Specification Group Core Network and Terminals; Mobile Radio Interface Layer 3 Specification; Core Network Protocols; Stage 3; Release 15; Dec. 2017; 785 pages.
3GPP TS 27.007 V15.0.0; 3rd Generation Partnership Project; Technical Specification Group Core Network and Terminals; AT Command Set for User Equipment (UE); Release 15; Dec. 2017; 354 pages.
3GPP TS 24.301 V15.1.1; 3rd Generation Partnership Project; Technical Specification Group Core Network and Terminals; Non-Access-Stratum (NAS) Protocol for Evolved Packet System (EPS); Stage 3; Release 15; Jan. 2018; 507 pages.
3GPP TS 23.401 V15.2.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 15; Dec. 2017; 404 pages.

(56) References Cited

OTHER PUBLICATIONS

3GPP TS 36.413 V15.0.0; 3rd Generation Partnership Project; Technical Specification Group Radio Access Network; Evolved Universal Terrestrial Radio Access Network (E-UTRAN); S1 Application Protocol (S1AP); Release 15; Dec. 2017; 367 pages.
3GPP TS 36.331 V15.0.1; 3rd Generation Partnership Project; Technical Specification Group Radio Access Network; Evolved Universal Terrestrial Radio Access (E-UTRA); Radio Resource Control (RRC); Protocol Specification; Release 15; Jan. 2018; 776 pages.
SA WG2 Meeting #127; "Solution for KI4 Track 2: Power Saving Functions"; S2-18xxxx; Sanya, China; Apr. 16-20, 2018; 4 pages.
SA WG2 Meeting #127; "Enhanced MICO for Power Saving Solution"; S2-18xxxx; Sanya, P.R. of China; Apr. 16-20, 2018; 4 pages.
SA WG2 Meeting #127; "NIDD Aspects for Small Data Transfer via NAS-SM"; S2-18xxxx; Sanya, P.R. of China; Apr. 16-20, 2018; 17 pages.
3GPP TSG-SA WG2 Meeting #127; "Addressing Open Issues of Solution 1 for Infrequent Small Data Transfer"; S2-18xxxx; Sanya, P.R. of China; Apr. 16-20, 2018; 13 pages.
3GPP TSG SA WG2 #127; "TR 23.724 Candidate Solution Connectionless Data"; S2-18xxxx; Sanya, China; Apr. 16-20, 2018; 14 pages.
SA WG2 Meeting #127; "Solution: RRC Inactive for Frequent Small Data Transmission"; S2-18xxxx; Sanya, China; Apr. 16-20, 2018; 3 pages.
SA WG2 Meeting #127; "Solution for KI5: Delay Paging Response for MT Case"; S2-18xxxx; Sanya, P.R. of China; Apr. 16-20, 2018; 7 pages.
SA WG2 Meeting #127; "Solution for KI5: Delay UL Transmission for MO Case"; S2-18xxxx; Sanya, P.R. of China; Apr. 16-20, 2018; 3 pages.
SA WG2 Meeting #127; "Key Issue #5 Solution: MO Data Buffering"; S2-18xxxx; Sanya, P.R. of China; Apr. 16-20, 2018; 5 pages.
SA WG2 Meeting #127; "Key Issue #9 Solution: SCEF+NEF Node"; S2-18xxxx; Sanya, P.R. of China; Apr. 16-20, 2018; 3 pages.

\* cited by examiner

400

4.5.4 UE Power Saving Mode

.....

When the UE wants to use the PSM it shall request an Active Time value during every Attach and TAU/RAU procedures. If the network supports PSM and accepts that the UE uses PSM, the network confirms usage of PSM by allocating an Active Time value to the UE. The network takes the UE requested value, the Maximum Response Time (defined in clause 5.6.1.4), if provided with the Insert Subscriber Data message from HSS, Message Waiting Indication (MWI) (defined in 3GPP TS 23.040) and any local MME/SGSN configuration into account for determining the Active Time value that is allocated to the UE. If the UE wants to change the Active Time value, e.g. when the conditions are changed in the UE, the UE consequently requests the value it wants in the TAU/RAU procedure.

- NOTE 2: The minimum recommended length for the Active Time is the time allowing for the 'msg waiting flag' in the MME/SGSN to trigger the SMSC via the HSS to deliver an SMS to the MME/SGSN, e.g. 2 DRX cycles plus 10 seconds.

- NOTE 3: The Maximum Response Time value can be configured as desired Active Time value in the HSS via O&M.

- NOTE 4: If MWI for the UE is not set, then the Active Timer could be set to 0 seconds.

5.5.1.2.4 Attach accepted by the network

....

NOTE 3: When assigning the TAI list, the MME can take into account the eNodeB's capability of support of CIoT EPS optimization.

The MME may include T3412 extended value IE in the ATTACH ACCEPT message only if the UE indicates support of the extended periodic timer T3412 in the MS network feature support IE in the ATTACH REQUEST message.

The MME shall include the T3324 value IE in the ATTACH ACCEPT message only if the T3324 value IE was included in the ATTACH REQUEST message, and the MME supports and accepts the use of PSM. The MME may also include Downlink Traffic available IE if the MWI flag is set and T3324 IE was included in the ATTACH REQUEST message.

If the MME supports and accepts the use of PSM, and the UE included the T3412 extended value IE in the ATTACH REQUEST message, then the MME shall take into account the T3412 value requested when providing the T3412 value IE and the T3412 extended value IE in the ATTACH ACCEPT message.

NOTE 4: Besides the value requested by the UE, the MME can take local configuration or subscription data provided by the HSS into account when selecting a value for T3412 (3GPP TS 23.401 [10] subclause 4.3.17.3).

If the ATTACH ACCEPT message contains the T3412 extended value IE, then the UE shall use the value in T3412 extended value IE as periodic tracking area update timer (T3412). If the ATTACH ACCEPT message does not contain T3412 extended value IE, then the UE shall use the value in T3412 value IE as periodic tracking area update timer (T3412).

If the ATTACH ACCEPT message contains the T3324 value IE, then a) If the Downlink traffic availability was included in the ATTACH ACCEPT and is set to indicate the MWI is false the UE may ignore timer T3324; or b) If the Downlink traffic availability was included in the ATTACH ACCEPT and is set to indicate MWI is true or Downlink traffic availability was not included in the ATTACH ACCEPT the UE shall use the included timer value for T3324 as specified in 3GPP TS 24.008 [13], subclause 4.7.2.8.

5.5.3.2.4    Normal and periodic tracking area updating procedure accepted by the network

….

The MME may include T3412 extended value IE in the TRACKING AREA UPDATE ACCEPT message only if the UE indicates support of the extended periodic timer T3412 in the MS network feature support IE in the TRACKING AREA UPDATE REQUEST message.

The MME shall include the T3324 value IE in the TRACKING AREA UPDATE ACCEPT message only if the T3324 value IE was included in the TRACKING AREA UPDATE REQUEST message, and the MME supports and accepts the use of PSM. The MME may also include Downlink Traffic available IE if the MWI flag is set and T3324 IE was included in the TRACKING AREA UPDATE REQUEST message.

FIG. 6B

If the MME supports and accepts the use of PSM, and the UE included the T3412extended value IE in the TRACKING AREA UPDATE REQUEST message, then the MME shall take into account the T3412 value requested when providing the T3412 value IE and the T3412 extended value IE in the TRACKING AREA UPDATE ACCEPT message.

> NOTE 4: Besides the value requested by the MS, the MME can take local configuration or subscription data provided by the HSS into account when selecting a value for T3412 (see 3GPP TS 23.401 [10] subclause 4.3.17.3).

If the MME includes the T3324 value IE indicating a value other than deactivated in the TRACKING AREA UPDATE ACCEPT message, then the MME shall indicate in the EPS update result IE in the TRACKING AREA UPDATE ACCEPT message that ISR is not activated.

....

FIG. 6C 8.2   EPS mobility management messages 8.2.1   Attach accept 8.2.1.1   Message definition This message is sent by the network to the UE to indicate that the corresponding attach request has been accepted. See table 8.2.1.1.

Message type:   ATTACH ACCEPT

Significance:   dual

Direction:   network to UE

Table 8.2.1.1: ATTACH ACCEPT message content

| IEI | Information Element | Type/Reference | Presence | Format | Length |
|---|---|---|---|---|---|
|  | ……  |  |  |  |  |
| E- | SMS services status | SMS services status 9.9.3.4B | O | TV | 1 |
| D- | Non-3GPP access provided emergency numbers policy | Non-3GPP access provided emergency numbers policy 9.9.3.49 | O | TV | 1 |
| 6B | T3448 value | GPRS timer 2 9.9.3.16A | O | TLV | 3 |
|  | Downlink Traffic available | Downlink Traffic 9.9.3.X | O | TLV | 3 |

…..

FIG. 6D 8.2.1.18    T3448 value

The network may include this IE if the congestion control for transport of user data via the control plane is active and the UE supports timer T3448.

8.2.1.XX    Downlink Traffic Available

The network may include this IE if the MWI flag is set and the UE has included T3324 value IE.

8.2.26 Tracking area update accept
8.2.26.1    Message definition
This message is sent by the network to the UE to provide the UE with EPS mobility management related data in response to a tracking area update request message. See table 8.2.26.1.
   Message type:    TRACKING AREA UPDATE ACCEPT Significance:            dual Direction:               network to UE Table 8.2.26.1: TRACKING AREA UPDATE ACCEPT message content

| IEI | Information Element | Type/Reference | Presence | Format | Length |
|---|---|---|---|---|---|
| | …… | | | | |
| 65 | DCN-ID | DCN-ID 9.9.3.48 | O | TLV | 4 |
| E- | SMS services status | SMS services status 9.9.3.4B | O | TV | 1 |
| D- | Non-3GPP access provided emergency numbers policy | Non-3GPP access provided emergency numbers policy 9.9.3.49 | O | TV | 1 |
| 6B | T3448 value | GPRS timer 2 9.9.3.16A | O | TLV | 3 |
| | Downlink Traffic available | Downlink Traffic 9.9.3.X | O | TLV | 3 |

…..

FIG. 6E 8.2.26.21    T3448 value
The network may include this IE if the congestion control for transport of user data via the control plane is active and the UE supports timer T3448.

8.2.26.XX    Downlink Traffic Available
The network may include this IE if the MWI flag is set and the network has included T3324 value IE.

9.9.3.X    Downlink Traffic Available
The purpose of the Downlink Traffic IE is to indicate to a UE that it should expect some downlink traffic.
The Downlink Traffic IE is coded as shown in figure 9.9.3.X.1 and table 9.9.3.X.1.
The Downlink Traffic is a type 3 information element with 3 octets length.

| 8 | 7 | 6 | 5 | 4 | 3 | 2 | 1 | |
|---|---|---|---|---|---|---|---|---|
| Downlink Traffic Available IEI | | | | | | | | octet 1 |
| Length | | | | | | | | octet 2 |
| 0 | 0 | 0 | 0 | 0 | 0 | 0 | MWI Status | octet 3 |
| spare | | | | | | | | |

Figure 9.9.3.X.1: Downlink Traffic Available information element

Table 9.9.3.X.1: Downlink Traffic Available information element

| MWI status (octet 3) |
|---|
| Bit |
| 1 |
| 0      MWI False |
| 1      MWI True |

FIG. 6F 5.5.1.2.4 Attach accepted by the network

....

NOTE 3:   When assigning the TAI list, the MME can take into account the eNodeB's capability of support of CIoT EPS optimization.

The MME may include T3412 extended value IE in the ATTACH ACCEPT message only if the UE indicates support of the extended periodic timer T3412 in the MS network feature support IE in the ATTACH REQUEST message.
The MME shall include the T3324 value IE in the ATTACH ACCEPT message only if the T3324 value IE was included in the ATTACH REQUEST message, and the MME supports and accepts the use of PSM. The MME shall also include Delaytolerable Traffic supported IE if MMOT traffic is supported and T3324 IE was included in the ATTACH ACCEPT.
If the MME supports and accepts the use of PSM, and the UE included the T3412 extended value IE in the ATTACH REQUEST message, then the MME shall take into account the T3412 value requested when providing the T3412 value IE and the T3412 extended value IE in the ATTACH ACCEPT message.

NOTE 4:   Besides the value requested by the UE, the MME can take local configuration or subscription data provided by the HSS into account when selecting a value for T3412 (3GPP TS 23.401 [10] subclause 4.3.17.3).

......

If the ATTACH ACCEPT message contains the T3412 extended value IE, then the UE shall use the value in T3412 extended value IE as periodic tracking area update timer (T3412). If the ATTACH ACCEPT message does not contain T3412 extended value IE, then the UE shall use the value in T3412 value IE as periodic tracking area update timer (T3412).
If the ATTACH ACCEPT message contains the T3324 value IE, then c) If the MMOT traffic capability was included in the ATTACH ACCEPT message and is set to indicate the network supports MMOT traffic the UE may ignore timer T3324 and may use timer X1; or d) If the MMOT traffic capability was included in the ATTACH ACCEPT message and is set to indicate the network does not supports MMOT traffic or MMOT traffic capability was not included in the ATTACH ACCEPT message the UE shall use the included timer value for T3324 as specified in 3GPP TS 24.008 [13], subclause 4.7.2.8.

FIG. 8A 5.5.3.2.4   Normal and periodic tracking area updating procedure accepted by the network
....

The MME may include T3412 extended value IE in the TRACKING AREA UPDATE ACCEPT message only if the UE indicates support of the extended periodic timer T3412 in the MS network feature support IE in the TRACKING AREA UPDATE REQUEST message.
The MME shall include the T3324 value IE in the TRACKING AREA UPDATE ACCEPT message only if the T3324 value IE was included in the TRACKING AREA UPDATE REQUEST message, and the MME supports and accepts the use of PSM. The MME may also include Delaytolerable Traffic available IE if MMOT traffic is supported flag and T3324 IE was included in the TRACKING AREA UPDATE REQUEST message.
If the MME supports and accepts the use of PSM, and the UE included the T3412extended value IE in the TRACKING AREA UPDATE REQUEST message, then the MME shall take into account the T3412 value requested when providing the T3412 value IE and the T3412 extended value IE in the TRACKING AREA UPDATE ACCEPT message.
> NOTE 4:   Besides the value requested by the MS, the MME can take local configuration or subscription data provided by the HSS into account when selecting a value for T3412 (see 3GPP TS 23.401 [10] subclause 4.3.17.3).

If the MME includes the T3324 value IE indicating a value other than deactivated in the TRACKING AREA UPDATE ACCEPT message, then the MME shall indicate in the EPS update result IE in the TRACKING AREA UPDATE ACCEPT message that ISR is not activated.
....

FIG. 8B 8.2 EPS mobility management messages
8.2.1 Attach accept
8.2.1.1 Message definition
This message is sent by the network to the UE to indicate that the corresponding attach request has been accepted. See table 8.2.1.1.
  Message type:    ATTACH ACCEPT Significance:         dual Direction:            network to UE Table 8.2.1.1: ATTACH ACCEPT message content

| IEI | Information Element | Type/Reference | Presence | Format | Length |
|---|---|---|---|---|---|
| | ...... | | | | |
| E- | SMS services status | SMS services status 9.9.3.4B | O | TV | 1 |
| D- | Non-3GPP access provided emergency numbers policy | Non-3GPP access provided emergency numbers policy 9.9.3.49 | O | TV | 1 |
| 6B | T3448 value | GPRS timer 2 9.9.3.16A | O | TLV | 3 |
| | Delaytolerable MT Traffic supported | MMOT Traffic Mobile Terminated Traffic 9.9.3.X | O | TLV | 3 |

.....

8.2.1.18    T3448 value
The network may include this IE if the congestion control for transport of user data via the control plane is active and the UE supports timer T3448.

8.2.1.XX    MMOT Mobile Terminated Traffic supported
The network may include this IE if the MME supports MMOT Mobile Terminated traffic and the UE has included T3324 value IE.

FIG. 8C 8.2.26 Tracking area update accept
8.2.26.1      Message definition
This message is sent by the network to the UE to provide the UE with EPS mobility management related data in response to a tracking area update request message. See table 8.2.26.1.

Message type:   TRACKING AREA UPDATE ACCEPT

Significance:         dual

Direction:            network to UE

Table 8.2.26.1: TRACKING AREA UPDATE ACCEPT message content

| IEI | Information Element | Type/Reference | Presence | Format | Length |
|---|---|---|---|---|---|
| | …… | | | | |
| 65 | DCN-ID | DCN-ID 9.9.3.48 | O | TLV | 4 |
| E- | SMS services status | SMS services status 9.9.3.4B | O | TV | 1 |
| D- | Non-3GPP access provided emergency numbers policy | Non-3GPP access provided emergency numbers policy 9.9.3.49 | O | TV | 1 |
| 6B | T3448 value | GPRS timer 2 9.9.3.16A | O | TLV | 3 |
| | Delaytolerable Mobile terminated Traffic supported | MMOT Mobile Terminated Traffic 9.9.3.X | O | TLV | 3 |

……

FIG. 8D 8.2.26.21   T3448 value
The network may include this IE if the congestion control for transport of user data via the control plane is active and the UE supports timer T3448.

8.2.26.XX   MMOT Mobile Terminated Traffic supported
The network may include this IE if the MME supports MMOT traffic and the UE has included T3324 value IE.

9.9.3.X   MMOT Traffic Available
The purpose of the MMOT Traffic information element is to indicate to a UE that the network supports MMOT traffic.
The Delay tolerable Traffic information element is coded as shown in figure 9.9.3.X.1 and table 9.9.3.X.1.
The Delaytolerable Traffic is a type 3 information element with 2 octets length.

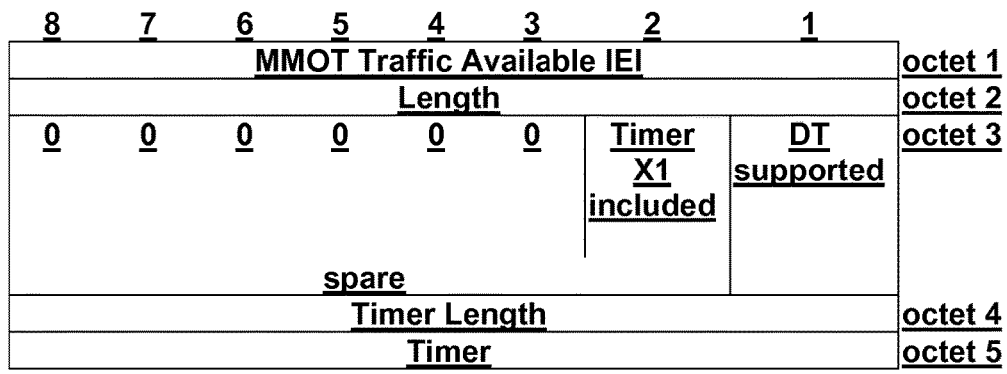

Figure 9.9.3.X.1: MMOT Traffic Available information element

Table 9.9.3.X.1: MMOT Traffic Available information element

| DT status (octet 3) |
| --- |
| Bit |
| 1 |
| 0          MMOT traffic is supported |
| 1          MMOT traffic is not supported |

FIG. 8E

4.5.4 UE Power Saving Mode

A UE may adopt the PSM for reducing its power consumption. That mode is similar to power-off, but the UE remains registered with the network and there is no need to re-attach or re-establish PDN connections. A UE in PSM is not immediately reachable for mobile terminating services. A UE may include an indication that MMOT Mobile Terminated services is required. A UE using PSM is available for mobile terminating services during the time it is in connected mode and for the period of an Active Time that is after the connected mode. The connected mode is caused by a mobile originated event like data transfer or signalling, e.g. after a periodic TAU/RAU procedure. PSM is therefore intended for UEs that are expecting only infrequent mobile originating and terminating services and that can accept a corresponding latency in the mobile terminating communication.

For mobile terminated data while a UE is in PSM, the functions for High latency communication may be used as described in clause 4.5.7.

PSM has no support in the CS domain on the network side. PSM should only be used by UEs using the PS domain, SMS and mobile originated IMS or CS services. A UE that uses mobile terminated CS services other than SMS should not use PSM as the CS domain does not provide support for mobile terminated CS voice services to UEs that are in PSM. A UE that uses delay tolerant mobile terminated IMS services other than SMS should not request for PSM unless IMS uses the functions for High latency communication as described in clause 4.5.7.

> NOTE 1: The frequency of keep-alive messages on Gm impacts the possibility to use IMS services for UEs applying PSM.

Applications that want to
- use the PSM need to consider specific handling of mobile terminating services or data transfers. A network side application may send an SMS or a device trigger to trigger an application on UE to initiate communication with the SCS/AS, which is delivered when the UE becomes reachable. Alternatively a network side application may request monitoring of reachability for data to receive a notification when it is possible to send downlink data immediately to the UE, which is when the UE becomes reachable for downlink data transfer. Alternatively, if an SCS/AS has periodic downlink data, it is more efficient when the UE initiates communication with the SCS/AS to poll for downlink data with that period. For either of the options to work, the UE should request an Active Time that is together with the time being in connected mode long enough to allow for potential mobile terminated service or data delivery, e.g. to deliver an SMS.
- do not want to receive mobile terminating services. The UE may include an indication to the network that the UE does not want to receive mobile terminating services.

FIG. 10A

When the UE wants to use the PSM it shall request an Active Time value and optionally include an indication that mobile terminating services are not requested during every Attach and TAU/RAU procedures. If the network supports PSM and accepts that the UE uses PSM, the network confirms usage of PSM by allocating an Active Time value to the UE. The network takes the UE requested value, the received indication that mobile terminating services are not requested, the Maximum Response Time (defined in clause 5.6.1.4), if provided with the Insert Subscriber Data message from HSS, Message Waiting Indication (defined in 3GPP TS 23.040) and any local MME/SGSN configuration into account for determining the Active Time value that is allocated to the UE. If the UE wants to change the Active Time value, e.g. when the conditions are changed in the UE, the UE consequently requests the value it wants in the TAU/RAU procedure.

NOTE 2:   The minimum recommended length for the Active Time is the time allowing for the 'msg waiting flag' in the MME/SGSN to trigger the SMSC via the HSS to deliver an SMS to the MME/SGSN, e.g. 2 DRX cycles plus 10 seconds.

NOTE 3:   The Maximum Response Time value can be configured as desired Active Time value in the HSS via O&M.

NOTE 4   If mobile terminating services are not requested by the UE the Active Timer could be set to 0 seconds.

An Active Time may be shorter than the time estimated for delivering a waiting SMS to the UE in NOTE 2 above, e.g. 0 seconds. If the MME/SGSN allocates such a shorter Active Time to the UE, the MME/SGSN (for signalling only connections and if the 'msg waiting flag' is set) and the RAN (for connections with RAB(s) set up) should be configured to keep the connection with the UE sufficiently long such that a waiting SMS can be delivered.

NOTE 4:   The RAN configuration of RAB connection times need not differentiate between UEs.

FIG. 10B 4.3.22 UE Power Saving Mode
A UE may adopt a PSM that is described in TS 23.682 [74]. If a UE is capable of adopting a PSM and it wants to use the PSM it shall request an Active Time value and may request a Periodic TAU/RAU Timer value during every Attach and TAU procedures, which are handled as described in TS 23.682 [74]. If the UE supports MMOT Mobile Terminated services the UE may include an indication of such support. The UE shall not request a Periodic TAU/RAU Timer value if it is not requesting an Active Time value. The network shall not allocate an Active Time value if the UE has not requested it.
PSM has no support in the CS domain on the network side.
  NOTE 1:  When the PSM is activated the UE might not be available for paging of Mobile Terminated CS services even though the UE is registered in the CS domain.

NOTE 2:  The Attach and TAU procedures of this specification are not showing the details of the Periodic TAU Time and Active Time negotiation, i.e. are not showing the related IEs.

FIG. 11

5.5.1.2.2 Attach procedure initiation

....

If the UE supports eDRX and requests the use of eDRX, the UE shall include the extended DRX parameters IE in the ATTACH REQUEST message.
If the UE supports SRVCC to GERAN/UTRAN, the UE shall set the SRVCC to GERAN/UTRAN capability bit to "SRVCC from UTRAN HSPA or E-UTRAN to GERAN/UTRAN supported".
If the UE supports vSRVCC from S1 mode to Iu mode, then the UE shall set the H.245 after handover capability bit to "H.245 after SRVCC handover capability supported" and additionally set the SRVCC to GERAN/UTRAN capability bit to "SRVCC from UTRAN HSPA or E-UTRAN to GERAN/UTRAN supported" in the ATTACH REQUEST message.
If the UE supports PSM and requests the use of PSM, then the UE shall include the T3324 value IE with a requested timer value in the ATTACH REQUEST message.
If the UE supports MMOT Traffic the UE may set the "MMOT capability supported" bit to one. When the UE includes the T3324 value IE and the UE indicates support for extended periodic timer value in the MS network feature support IE, it may also include the T3412 extended value IE to request a particular T3412 value to be allocated.
If the UE supports ProSe direct discovery, then the UE shall set the ProSe bit to "ProSe supported" and set the ProSe direct discovery bit to "ProSe direct discovery supported" in the UE network capability IE of the ATTACH REQUEST message.

5.5.1.2.4 Attach accepted by the network

.....

If the UE specific DRX parameter was included in the DRX Parameter IE in the ATTACH REQUEST message, the MME shall replace any stored UE specific DRX parameter with the received parameter and use it for the downlink transfer of signalling and user data.
In NB-S1 mode, if the UE requested "SMS only" in the Additional update type IE, supports NB-S1 mode only and the MME decides to accept the attach request for EPS services and "SMS only", the MME shall indicate "SMS only" in the Additional update result IE and shall set the EPS attach result IE to "EPS only" in the ATTACH ACCEPT message.
The MME shall include the extended DRX parameters IE in the ATTACH ACCEPT message only if the extended DRX parameters IE was included in the ATTACH REQUEST message, and the MME supports and accepts the use of eDRX.
The MME shall assign and include the TAI list the UE is registered to in the ATTACH ACCEPT message. The MME shall not assign a TAI list containing both tracking areas in NB-S1 mode and tracking areas in WB-S1 mode. The UE, upon receiving an ATTACH ACCEPT message, shall delete its old TAI list and store the received TAI list.

FIG. 12A

NOTE 3: When assigning the TAI list, the MME can take into account the eNodeB's capability of support ofCIoT EPS optimization.

The MME may include T3412 extended value IE in the ATTACH ACCEPT message only if the UE indicates support of the extended periodic timer T3412 in the MS network feature support IE in the ATTACH REQUEST message.
The MME shall include the T3324 value IE in the ATTACH ACCEPT message only if the T3324 value IE was included in the ATTACH REQUEST message, and the MME supports and accepts the use of PSM. If the UE sets the "MMOT capability supported" bit to one and the MWI flag is not set, then T3324 may be set to zero seconds.
If the MME supports and accepts the use of PSM, and the UE included the T3412 extended value IE in the ATTACH REQUEST message, then the MME shall take into account the T3412 value requested when providing the T3412 value IE and the T3412 extended value IE in the ATTACH ACCEPT message.

FIG. 12B 10.5.5.12   MS network capability
......

Table 10.5.145/3GPP TS 24.008 *MS network capability* information element

...

MMOT traffic capability

This information field indicates if the MS supports MMOT traffic
  0   Mobile   station   does   not   support   MMOT   traffic
  1   Mobile station supports MMOT traffic 10.5.1.7   Mobile Station Classmark 3
.....

Table 10.5.1.7/3GPP TS 24.008 (continued): *Mobile Station Classmark 3* information element

-   .....
MMOTtraffic capability (1 bit field)
This field indicates whether the mobile station supports the MMOT traffic.
It is coded as follows:

Bit
    0    Mobile station does not support MMOT traffic
    1    Mobile station supports MMOT traffic

FIG. 13

5.3.5 S1 release procedure
This procedure is used to release the logical S1-AP signalling connection (over S1-MME) and all S1 bearers (in S1-U) for a UE. This Procedure releases the S11-U bearer in Control Plane CIoT EPS optimisation (except in case of buffering in MME), instead of the S1-U bearer. The procedure will move the UE from ECM-CONNECTED to ECM-IDLE in both the UE and MME, and all UE related context information is deleted in the eNodeB. When the S1-AP signalling connection is lost, e.g. due to loss of the signalling transport or because of an eNodeB or MME failure, the S1 release procedure is performed locally by the eNodeB and by the MME. When the S1 release procedure is performed locally by the eNodeB or by the MME each node performs locally its actions as described in the procedure flow below without using or relying on any of the signalling shown directly between eNodeB and MME.
The initiation of S1 Release procedure is either:
- eNodeB-initiated with cause e.g. O&M Intervention, Unspecified Failure, User Inactivity, Repeated RRC signalling Integrity Check Failure, Release due to UE generated signalling connection release, CS Fallback triggered, Inter-RAT Redirection, etc. as defined in TS 36.413 [36]; or

- MME-initiated with cause e.g. authentication failure, detach, not allowed CSG cell (e.g. the CSG ID of the currently used CSG cell expires or is removed from the CSG subscription data), etc.

Both eNodeB-initiated and MME-initiated S1 release procedures are shown in Figure 5.3.5-1.

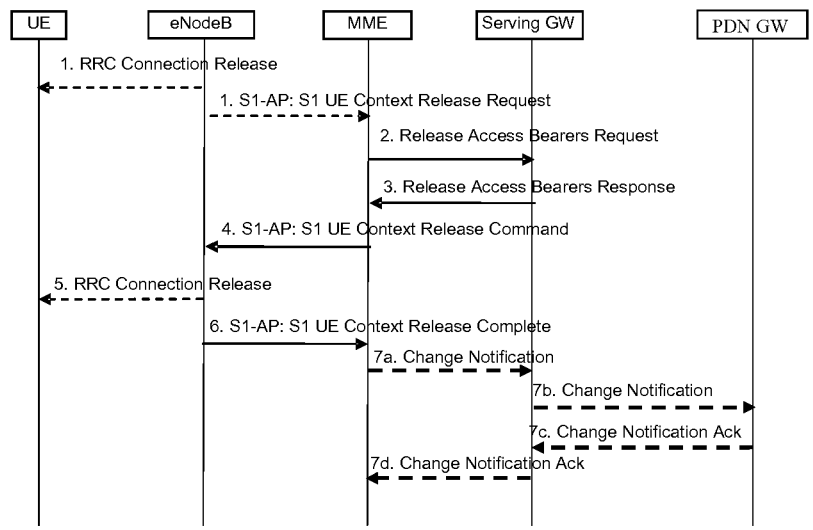

Figure 5.3.5-1: S1 Release Procedure

FIG. 14A

1a. In certain cases the eNodeB may release the UE's signalling connection before or in parallel to requesting the MME to release the S1 context, e.g. the eNodeB initiates an RRC Connection Release for CS Fallback by redirection.

1b. If the eNodeB detects a need to release the UE's signalling connection and all radio bearers for the UE, the eNodeB sends an S1 UE Context Release Request (Cause) message to the MME. Cause indicates the reason for the release (e.g. O&M intervention, unspecified failure, user inactivity, repeated integrity checking failure, or release due to UE generated signalling connection release).

> NOTE 1: Step 1 is only performed when the eNodeB-initiated S1 release procedure is considered. Step 1 is not performed and the procedure starts with Step 2 when the MME-initiated S1 release procedure is considered.
>
> For Control Plane CIoT EPS optimization with data buffering in the MME, step 2 and step 3 are skipped.

2. The MME sends a Release Access Bearers Request (Abnormal Release of Radio Link Indication) message to the S-GW that requests the release of all S1-U bearers for the UE, or the S11-U in Control Plane CIoT EPS optimisation if buffering is in the S-GW. This message is triggered either by an S1 Release Request message from the eNodeB, or by another MME event. The Abnormal Release of Radio Link Indication is included if the S1 release procedure is due to an abnormal release of the radio link.

3. If the S-GW has received a Release Access Bearers Request, the S-GW releases all eNodeB related information (address and TEIDs), or the MME TEIDs related information in Control Plane CIoT EPS optimisation (address and TEIDs), for the UE and responds with a Release Access Bearers Response message to the MME. Other elements of the UE's S-GW context are not affected. The S-GW retains the S1-U configuration that the S-GW allocated for the UE's bearers. The S-GW starts buffering downlink packets received for the UE and initiating the "Network Triggered Service Request" procedure, described in clause 5.3.4.3, if downlink packets arrive for the UE. In Control Plane CIoT EPS optimisation Downlink data triggers Mobile Terminated Data transport in NAS signalling defined in clause 5.3.4B.3.
> NOTE 2: Based on operator policy any received Indication of "Abnormal Release of Radio Link" may be used by Serving GW in subsequent decisions to trigger PDN charging pause if the feature has been enabled on that PDN.

FIG. 14B

4. The MME releases S1 by sending the S1 UE Context Release Command (Cause) message to the eNodeB. If the MME determines that the device has previously indicated that it is of type 'MO originated sessions only' and if the device is operating in power saving mode then the MME may include PSM State Transition Indicator within the NAS container, in the S1 UE Context Release Command message.

5. If the RRC connection is not already released, the eNodeB sends a RRC Connection Release message to the UE in Acknowledged Mode. If the MME provided the eNodeB with the NAS Container then the eNodeB conveys this container to the UE in the RRC Connection Release message. Once the message is acknowledged by the UE, the eNodeB deletes the UE's context.

6. The eNodeB confirms the S1 Release by returning an S1 UE Context Release Complete (ECGI, TAI, Secondary RAT usage data) message to the MME. With this, the signalling connection between the MME and the eNodeB for that UE is released. This step shall be performed promptly after step 4, e.g. it shall not be delayed in situations where the UE does not acknowledge the RRC Connection Release.

> The eNodeB may include the Information On Recommended Cells And eNodeBs For Paging in the S1 UE Context Release Complete message. If available, the MME shall store this information to be used when paging the UE.
>
> The eNB includes Information for Enhanced Coverage, if available, in the S1 UE Context Release Complete message.
>
> If the PLMN has configured secondary RAT usage data reporting and the eNodeB has Secondary RAT usage data to report, the Secondary RAT usage data is included in this message.

The MME deletes any eNodeB related information ("eNodeB Address in Use for S1-MME", "MME UE S1 AP ID" and "eNB UE S1AP ID") from the UE's MME context, but, retains the rest of the UE's MME context including the S-GW's S1-U configuration information (address and TEIDs). All non-GBR EPS bearers established for the UE are preserved in the MME and in the Serving GW.

If the cause of S1 release is because of User I inactivity, Inter-RAT Redirection, the MME shall preserve the GBR bearers. If the cause of S1 release is because of CS Fallback triggered, further details about bearer handling are described in TS 23.272 [58]. Otherwise, e.g. Radio Connection With UE Lost, S1 signalling connection lost, eNodeB failure the MME shall trigger the MME Initiated Dedicated Bearer Deactivation procedure (clause 5.4.4.2) for the GBR bearer(s) of the UE after the S1 Release procedure is completed.

FIG. 14C

NOTE 3: EPC does not support the GPRS preservation feature with setting the MBR for GBR bearers to zero.

NOTE 4: The MME can defer the deactivation of GBR bearers for a short period (in the order of seconds) upon receipt of an S1AP UE Context Release Request due to radio reasons, so as to allow the UE to re-establish the corresponding radio and S1-U bearers and thus avoid deactivation of the GBR bearers.

If LIPA is active for a PDN connection, the HeNB informs the collocated L-GW by internal signalling to releases the direct user plane path to the HeNB. After the direct user plane path is released, if downlink packets arrive for the UE, the L-GW forwards the first packet on the S5 tunnel to the S-GW to initiate the "Network Triggered Service Request" procedure, as described in clause 5.3.4.3.

7. If the eNodeB provided Secondary RAT usage data in Step 6, the MME initiates the Secondary RAT usage data reporting procedure in clause 5.7A.3 as illustrated in figure 5.7A.3-2.

FIG. 14D 9.1.4.6   UE CONTEXT RELEASE COMMAND
This message is sent by the MME to request the release of the UE-associated S1-logical connection over the S1 interface.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| CHOICE *UE S1AP IDs* | M | | | | YES | reject |
| >*UE S1AP ID pair* | | | | | | |
| >>UE S1AP ID pair | M | | 9.2.3.18 | | | |
| >*MME UE S1AP ID* | | | | | | |
| >>MME UE S1AP ID | M | | 9.2.3.3 | | | |
| NAS container | O | | | | | |
| Cause | M | | 9.2.1.3 | | YES | ignore |

FIG. 15

9.9.3.42 Generic message container type

The purpose of the generic message container type information element is to specify the type of message contained in the generic message container IE.
The generic message container type information element is coded as shown in table 9.9.3.42.1.

Table 9.9.3.42.1: Generic message container type information element

| Bits 8 7 6 5 4 3 2 1 | |
|---|---|
| 0 0 0 0 0 0 0 0 | Reserved |
| 0 0 0 0 0 0 0 1 | LTE Positioning Protocol (LPP) message container (see 3GPP TS 36.355 [22A]) |
| 0 0 0 0 0 0 1 0 | Location services message container (see 3GPP TS 24.171 [13C]) |
| 0 0 0 0 0 0 1 1 to 0 1 1 1 1 1 1 1 | PSM state transition indication Unused |
| 1 0 0 0 0 0 0 0 to 1 1 1 1 1 1 1 1 | Reserved |

X.X2.1.16  PSM State Transition Indication container

This IE enables information to be conveyed from MME to the UE as part of the S1 Release procedure

| IE/Group Name | Presence | Range | IE type and reference | Semantics description | Criticality | Assigned Criticality |
|---|---|---|---|---|---|---|
| MME to UE container | O | | | | - | |
| ➤ PSM State Transition Indicator | | | ENUMERATED(PSM Active Time, PSM Deep Sleep) | Indicates to which PSM state the device should transition following transition out of ECM_CONNECTED state. | | |

FIG. 16

4.5.4 UE Power Saving Mode

A UE may adopt the PSM for reducing its power consumption. That mode is similar to power-off, but the UE remains registered with the network and there is no need to re-attach or re-establish PDN connections. A UE in PSM is not immediately reachable for mobile terminating services.

A UE using PSM is available for mobile terminating services, either

> during the time it is in connected mode and for the period of an Active Time that is after the connected mode. The connected mode is caused by a mobile originated event like data transfer or signalling, e.g. after a periodic TAU/RAU procedure.

or

> during the time it is in connected mode and for the period of an Active Time that is after the connected mode. The connected mode is caused by a mobile originated TAU/RAU procedure.

Where selection between these two modes of operation is determined at time of attach.

PSM is therefore intended for UEs that are expecting only infrequent mobile originating and terminating services and that can accept a corresponding latency in the mobile terminating communication.

For mobile terminated data while a UE is in PSM, the functions for High latency communication may be used as described in clause 4.5.7.

PSM has no support in the CS domain on the network side. PSM should only be used by UEs using the PS domain, SMS and mobile originated IMS or CS services. A UE that uses mobile terminated CS services other than SMS should not use PSM as the CS domain does not provide support for mobile terminated CS voice services to UEs that are in PSM. A UE that uses delay tolerant mobile terminated IMS services other than SMS should not request for PSM unless IMS uses the functions for High latency communication as described in clause 4.5.7.

NOTE 1: The frequency of keep-alive messages on Gm impacts the possibility to use IMS services for UEs applying PSM.

FIG. 17

5.3.5 Handling of the periodic tracking area update timer and mobile reachable timer (S1 mode only)

The periodic tracking area updating procedure is used to periodically notify the availability of the UE to the network. The procedure is controlled in the UE by timer T3412. The value of timer T3412 is sent by the network to the UE in the ATTACH ACCEPT message and can be sent in the TRACKING AREA UPDATE ACCEPT message. The UE shall apply this value in all tracking areas of the list of tracking areas assigned to the UE until a new value is received.

If timer T3412 received by the UE in an ATTACH ACCEPT or TRACKING AREA UPDATE ACCEPT message contains an indication that the timer is deactivated or the timer value is zero, then timer T3412 is deactivated and the UE shall not perform the periodic tracking area updating procedure.

If timer T3412 received by the UE in an ATTACH ACCEPT or TRACKING AREA UPDATE ACCEPT message contains an indication that regular TAU is required then the Timer T3412 is reset and started with its initial value, following reception of the TRACKING AREA UPDATE ACCEPT message. Otherwise, Timer T3412 is reset and started with its initial value, when the UE changes from EMM-CONNECTED to EMM-IDLE mode. Timer T3412 is stopped when the UE enters EMM-CONNECTED mode or the EMM-DEREGISTERED state.

If the UE is attached for emergency bearer services, and timer T3412 expires, the UE shall not initiate a periodic tracking area updating procedure, but shall locally detach from the network. When the UE is camping on a suitable cell, it may re-attach to regain normal service.

When a UE is not attached for emergency bearer services, and timer T3412 expires, the periodic tracking area updating procedure shall be started and the timer shall be set to its initial value for the next start.

If the UE is not attached for emergency bearer services, and is in a state other than EMM-REGISTERED.NORMAL-SERVICE when timer T3412 expires, the periodic tracking area updating procedure is delayed until the UE returns to EMM-REGISTERED.NORMAL-SERVICE.

FIG. 18

CIoT optimization configuration +CCIOTOPT
Table 7.42-1: CIOPT parameter command syntax

| Command | Possible Response(s) |
|---|---|
| +CCIOTOPT=[<n>,[<supported_UE_opt>[,<preferred_UE_opt>][,<session_initiation_pref>]]] | +CME ERROR: <err> |
| +CCIOTOPT? | +CCIOTOPT :<n>,<supported_UE_opt>,<preferred_UE_opt>,<session_initiation_pref> |
| +CCIOTOPT=? | +CCIOTOPT: (list of supported <n>s),(list of supported <supported_UE_opt>s),(list of supported <preferred_UE_opt>s,(list of supported <session_initiation_pref>s)) |

Description
The set command controls which CIoT EPS optimizations or <u>session initiation</u> preference the UE indicates as supported and preferred in the ATTACH REQUEST and TRACKING AREA UPDATE REQUEST messages. The command also allows reporting of the CIoT EPS optimizations that are supported by the network. A UE supporting CIoT functionality may support control plane CIoT EPS optimization or user plane CIoT EPS optimization or both (see 3GPP TS 24.301 [83], subclause 9.9.3.34). Based on the application characteristics the UE may prefer to be registered for control plane CIoT EPS optimization or for user plane CIoT EPS optimization (see 3GPP TS 24.301 [83], subclause 9.9.3.0B). Further the network may support control plane CIoT EPS optimization or user plane CIoT EPS optimization or both (see 3GPP TS 24.301 [83], subclause 9.9.3.12A).
<u>The command also allows informing the network via the MT of the mobile originated session preference or session initiation preference. Based on the application characteristics the UE may prefer to be registered for mobile originated session only.</u>
The set command is used also to control the unsolicited result code +CCIOTOPTI. An unsolicited result code +CCIOTOPTI: <supported_Network_opt> is used to indicate the supported CIoT EPS optimizations by the network.
Refer subclause 9.2 for possible <err> values.
The read command returns the current settings for supported and preferred CIoT EPS optimizations and the current status of unsolicited result code +CCIOTOPTI.
The test command returns values supported as compound values.

FIG. 19A

Defined Values
  <n>: integer type. Enables or disables reporting of unsolicited result code +CCIOTOPTI.
    0 Disable reporting.
    1 Enable reporting.
    3 Disable reporting and reset the parameters for CIoT EPS optimization to the default values.
  <supported_UE_opt>: integer type; indicates the UE's support for CIoT EPS optimizations.
    0 No support.
    1 Support for control plane CIoT EPS optimization.
    2 Support for user plane CIoT EPS optimization.
    3 Support for both control plane CIoT EPS optimization and user plane CIoT EPS optimization.
  <preferred_UE_opt>: integer type; indicates the UE's preference for CIoT EPS optimizations.
    0 No preference.
    1 Preference for control plane CIoT EPS optimization.
    2 Preference for user plane CIoT EPS optimization.
  <supported_Network_opt>: integer type; indicates the Network support for CIoT EPS optimizations.
    0 No support.
    1 Support for control plane CIoT EPS optimization.
    2 Support for user plane CIoT EPS optimization.
    3 Support for both control plane CIoT EPS optimization and user plane CIoT EPS optimization.
  <session_initiation_pref>: integer type; indicates the session initiation preference.
    0 No support.
    1 Mobile session origination only preference.
    2 MMOT traffic preference.
    3 Support for both MMOT traffic preference and mobile session origination only preference.
Implementation
  Optional.
+CCIOTOPTI is used to inform the application of network acknowledgement:

FIG. 19B

Annex B (normative):
Summary of result codes

*ITU-T Recommendation V.250 [14] result codes which can be used in the present document and result codes defined in the present document:*

*Table B.1: Result codes*

| Verbose result code (V.250 command V1 set) | Numeric (V0 set) | Type | Description |
|---|---|---|---|
| ... | ... | ... | ... |
| +CCIOTOPTI | as verbose | unsolicited | refer subclause 7.xx |
| ... | ... | ... | ... |

FIG. 19C

5.5.1.2.4 Attach accepted by the network

....
  NOTE 3:   When assigning the TAI list, the MME can take into account the eNodeB's capability of support ofCIoT EPS optimiz ation.

The MME may include T3412 extended value IE in the ATTACH ACCEPT message only if the UE indicates support of the extended periodic timer T3412 in the MS network feature support IE in the ATTACH REQUEST message.

The MME shall include the T3324 value IE in the ATTACH ACCEPT message only if the T3324 value IE was included in the ATTACH REQUEST message, and the MME supports and accepts the use of PSM. If T3324 IE was included in the ATTACH REQUEST, the MME may include the:
  a) Downlink Traffic available flag if the MWI flag is set;
  b) Delaytolerable Traffic available flag to set if MMOT traffic is supported
  c) Include the UE is allowed to detach.
  NOTE 4:   It is an implementation option how the MME determines to indicate if the UE is allowed to detach.  The MME could take into account indications received from the UE and the type of pending MT traffic is there is any pending or not.

If the MME supports and accepts the use of PSM, and the UE included the T3412 extended value IE in the ATTACH REQUEST message, then the MME shall take into account the T3412 value requested when providing the T3412 value IE and the T3412 extended value IE in the ATTACH ACCEPT message.
  NOTE 4:   Besides the value requested by the UE, the MME can take local configuration or subscription data provided by the HSS into account when selecting a value for T3412 (3GPP TS 23.401 [10] subclause 4.3.17.3).

......
If the ATTACH ACCEPT message contains the T3412 extended value IE, then the UE shall use the value in T3412 extended value IE as periodic tracking area update timer (T3412). If the ATTACH ACCEPT message does not contain T3412 extended value IE, then the UE shall use the value in T3412 value IE as periodic tracking area update timer (T3412).
If the ATTACH ACCEPT message contains the T3324 value IE, then

FIG. 21A d) If the Downlink traffic availability was included in the ATTACH ACCEPT and is set to indicate the MWI is false or Delaytolerable Traffic available flag is set to indicated that MMOT traffic is supported the UE may ignore timer T3324; or e) If the Downlink traffic availability was included in the ATTACH ACCEPT and is set to MWI is true and Delaytolerable Traffic available flag is set to indicated that MMOT traffic is not supported or Downlink traffic availability was not included in the ATTACH ACCEPT f) the UE shall use the included timer value for T3324 as specified in 3GPP TS 24.008 [13], subclause 4.7.2.8.

If the Downlink traffic availability was included in the ATTACH ACCEPT and UE is allowed to detach is true then upon completing the sending of the data the UE may choose to Detach right away or use the included timer value for T3324 as specified in 3GPP TS 24.008 [13], subclause 4.7.2.8.

5.5.3.2.4 Normal and periodic tracking area updating procedure accepted by the network

....

The MME may include T3412 extended value IE in the TRACKING AREA UPDATE ACCEPT message only if the UE indicates support of the extended periodic timer T3412 in the MS network feature support IE in the TRACKING AREA UPDATE REQUEST message.

The MME shall include the T3324 value IE in the TRACKING AREA UPDATE ACCEPT message only if the T3324 value IE was included in the TRACKING AREA UPDATE REQUEST message, and the MME supports and accepts the use of PSM. The MME may also include Downlink Traffic available IE if the MWI flag is set and T3324 IE was included in the TRACKING AREA UPDATE REQUEST.

If the MME supports and accepts the use of PSM, and the UE included the T3412extended value IE in the TRACKING AREA UPDATE REQUEST message, then the MME shall take into account the T3412 value requested when providing the T3412 value IE and the T3412 extended value IE in the TRACKING AREA UPDATE ACCEPT message.

NOTE 4: Besides the value requested by the MS, the MME can take local configuration or subscription data provided by the HSS into account when selecting a value for T3412 (see 3GPP TS 23.401 [10] subclause 4.3.17.3).

If the MME includes the T3324 value IE indicating a value other than deactivated in the TRACKING AREA UPDATE ACCEPT message, then the MME shall indicate in the EPS update result IE in the TRACKING AREA UPDATE ACCEPT message that ISR is not activated.

....

FIG. 21B 8.2 EPS mobility management messages
8.2.1 Attach accept
8.2.1.1 Message definition
This message is sent by the network to the UE to indicate that the corresponding attach request has been accepted. See table 8.2.1.1.
   Message type:   ATTACH ACCEPT Significance:        dual Direction:           network to UE Table 8.2.1.1: ATTACH ACCEPT message content

| IEI | Information Element | Type/Reference | Presence | Format | Length |
|---|---|---|---|---|---|
| | …… | | | | |
| E- | SMS services status | SMS services status 9.9.3.4B | O | TV | 1 |
| D- | Non-3GPP access provided emergency numbers policy | Non-3GPP access provided emergency numbers policy 9.9.3.49 | O | TV | 1 |
| 6B | T3448 value | GPRS timer 2 9.9.3.16A | O | TLV | 3 |
| | Downlink Traffic available | Downlink Traffic 9.9.3.X | O | TLV | 5 |

…..

8.2.1.18    T3448 value
The network may include this IE if the congestion control for transport of user data via the control plane is active and the UE supports timer T3448.
8.2.1.XX    Downlink Traffic Available
The network may include this IE if the MWI flag is set and the UE has included T3324 value IE.

FIG. 21C 8.2.26 Tracking area update accept 8.2.26.1     Message definition

This message is sent by the network to the UE to provide the UE with EPS mobility management related data in response to a tracking area update request message. See table 8.2.26.1.

Message type:    TRACKING AREA UPDATE ACCEPT
Significance:         dual
Direction:             network to UE Table 8.2.26.1: TRACKING AREA UPDATE ACCEPT message content

| IEI | Information Element | Type/Reference | Presence | Format | Length |
|---|---|---|---|---|---|
|  | ...... |  |  |  |  |
| 65 | DCN-ID | DCN-ID 9.9.3.48 | O | TLV | 4 |
| E- | SMS services status | SMS services status 9.9.3.4B | O | TV | 1 |
| D- | Non-3GPP access provided emergency numbers policy | Non-3GPP access provided emergency numbers policy 9.9.3.49 | O | TV | 1 |
| 6B | T3448 value | GPRS timer 2 9.9.3.16A | O | TLV | 3 |
|  | Downlink Traffic available | Downlink Traffic 9.9.3.X | O | TLV | 3 |

.....

8.2.26.21    T3448 value

The network may include this IE if the congestion control for transport of user data via the control plane is active and the UE supports timer T3448.

FIG. 21D 8.2.26.XX  Downlink Traffic Available
The network may include this IE if the MWI flag is set and the network has included T3324 value IE.

9.9.3.X  Downlink Traffic Available
The purpose of the Downlink Traffic information element is to indicate to a device that it should expect some downlink traffic.
The Downlink Traffic information element is coded as shown in figure 9.9.3.X.1 and table 9.9.3.X.1.
The Downlink Traffic is a type 3 information element with 3 octets length.

| 8 | 7 | 6 | 5 | 4 | 3 | 2 | 1 | |
|---|---|---|---|---|---|---|---|---|
| colspan="8" | Downlink Traffic Available IEI | octet 1 |
| colspan="8" | Length | octet 2 |
| 0 | 0 | 0 | 0 | UE allowed to detach | Timer X1 included | DT supported | MWI Status | octet 3 |
| spare | | | | | | | | |
| colspan="8" | Timer Length | octet 4 |
| colspan="8" | Timer | octet 5 |

Figure 9.9.3.X.1: Downlink Traffic Available information element
Table 9.9.3.X.1: Downlink Traffic Available information element MWI status (octet 3)

Bit
1
0        MWI false
1        MWI True

Bit
2
0        MMOT traffic is supported
1        MMOT traffic is not supported

Bit
3
0        UE allowed to detach
1        UE not allowed to detach

FIG. 21E

Timer format is

| 8 7 6 | 5 4 3 2 1 | |
|---|---|---|
| Unit | Timer X1 value | octet 5 coding |

Timer X1 information element

Timer X1 value (octet 3)

Bits 5 to 1 represent the binary coded timer value.

Bits 6 to 8 defines the timer value unit for the Timer X1 as follows:
Bits
8 7 6
0 0 0 value is incremented in multiples of 10 minutes
0 0 1 value is incremented in multiples of 1 hour
0 1 0 value is incremented in multiples of 10 hours
0 1 1 value is incremented in multiples of 2 seconds
1 0 0 value is incremented in multiples of 30 seconds
1 0 1 value is incremented in multiples of 1 minute
1 1 0 value is incremented in multiples of 320 hours
1 1 1 value indicates that the timer is deactivated

FIG. 21F

1. The UE sends NAS message Service Request towards the MME encapsulated in an RRC message to the eNodeB. The RRC message(s) that can be used to carry the S-TMSI and this NAS message are described in TS 36.300 [5].

2. The eNodeB forwards NAS message to MME. NAS message is encapsulated in an S1-AP: Initial UE Message (NAS message, TAI+ECGI of the serving cell, S-TMSI, CSG ID, CSG access Mode, RRC establishment cause). Details of this step are described in TS 36.300 [5]. If the MME can't handle the Service Request it will reject it. CSG ID is provided if the UE sends the Service Request message via a CSG cell or a hybrid cell. CSG access mode is provided if the UE sends the Service Request message via a hybrid cell. If the CSG access mode is not provided but the CSG ID is provided, the MME shall consider the cell as a CSG cell.

If a CSG ID is indicated and CSG access mode is not provided, and there is no subscription data for this CSG ID and associated PLMN or the CSG subscription is expired, the MME rejects the Service Request with an appropriate cause. The UE shall remove the CSG ID and associated PLMN of the cell where the UE has initiated the service request procedure from the Allowed CSG list, if present.

For UEs with emergency EPS bearers, i.e. at least one EPS bearer has an ARP value reserved for emergency services, if CSG access restrictions do not allow the UE to get normal services the MME shall deactivate all non-emergency bearers and accept the Service Request.

If LIPA is active for a PDN connection and if the cell accessed by the UE does not link to the L-GW where the UE inititated the LIPA PDN Connection, the MME shall not request the establishment of the bearers of the LIPA PDN connection from the eNodeB in step 4 and shall request disconnection of the LIPA PDN connection according to clause 5.10.3. If the UE has no other PDN connection then the MME shall reject the Service Request with an appropriate cause value resulting in the UE detaching, skip the following steps of the procedure and initiate the release of the core network resources with the implicit MME-initiated Detach procedure according to clause 5.3.8.3.

If there is a "Availability after DDN Failure" monitoring event or a "UE Reachability" monitoring event configured for the UE in the MME, the MME sends an event notification (see TS 23.682 [74] for further information).

To assist Location Services, the eNB indicates the UE's Coverage Level to the MME.

FIG. 23B

3. NAS authentication/security procedures as defined in clause 5.3.10 on "Security function" may be performed.

4. If there is a Service Gap timer running in the MME MM Context for the UE and the MME is not waiting for a MT paging response from the UE, the MME rejects the Service Request with an appropriate cause. In addition, MME may also provide a UE with a Mobility Management Back-off timer set to the remaining value of the Service Gap timer.

The MME deletes S11-U related information in UE context if there is any, including TEID(DL) for the S11-U for Control Plane CIoT EPS Optimisation if data buffering is in the MME, ROHC context for Control Plane CIoT EPS Optimisation, etc, but not the Header Compression Configuration. The MME sends S1-AP Initial Context Setup Request (Serving GW address, S1-TEID(s) (UL), EPS Bearer QoS(s), Security Context, MME Signalling Connection Id, Handover Restriction List, CSG Membership Indication) message to the eNodeB. If there is a PDN connection established for Local IP Access, this message includes a Correlation ID for enabling the direct user plane path between the HeNB and the L-GW. If there is a PDN connection established for SIPTO at the Local Network with L-GW function collocated with the (H)eNB, this message includes a SIPTO Correlation ID for enabling the direct user plane path between the (H)eNB and the L-GW. This step activates the radio and S1 bearers for all the active EPS Bearers. The eNodeB stores the Security Context, MME Signalling Connection Id, EPS Bearer QoS(s) and S1-TEID(s) in the UE RAN context. The step is described in detail in TS 36.300 [5]. Handover Restriction List is described in clause 4.3.5.7 "Mobility Restrictions".

NOTE 2: In this release of the 3GPP specification the Correlation ID and SIPTO Correlation ID is set equal to the user plane PDN GW TEID (GTP-based S5) or GRE key (PMIP-based S5) which is specified in clause 5.3.2.1 and clause 5.10.2.

If the UE included support for restriction of use of Enhanced Coverage, the MME sends Enhanced Coverage Restricted parameter to the eNB in the S1-AP message.

The MME shall only request to establish Emergency EPS Bearer if the UE is not allowed to access the cell where the UE initiated the service request procedure due to CSG access restriction.

If the Service Request is performed via a hybrid cell, CSG Membership Indication indicating whether the UE is a CSG member shall be included in the S1-AP message from the MME to the RAN. Based on this information the RAN can perform differentiated treatment for CSG and non-CSG members.

<u>The eNode B is optionally provided with a Connection Maintenance Indication</u>

....

FIG. 23C 9.1.4.1 INITIAL CONTEXT SETUP REQUEST
This message is sent by the MME to request the setup of a UE context.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 .. <maxnoof E-RABs> | | | EACH | reject |
| >>E-RAB ID | M | | 9.2.1.2 | | - | |
| >>E-RAB Level QoS Parameters | M | | 9.2.1.15 | Includes necessary QoS parameters. | - | |
| >>Transport Layer Address | M | | 9.2.2.1 | | - | |
| >>GTP-TEID | M | | 9.2.2.2 | | - | |
| >>NAS-PDU | O | | 9.2.3.5 | | - | |
| >>Correlation ID | O | | 9.2.1.80 | | YES | ignore |
| >>SIPTO Correlation ID | O | | Correlation ID 9.2.1.80 | | YES | ignore |
| >>Bearer Type | O | | 9.2.1.116 | | YES | reject |

FIG. 23D

| UE Security Capabilities | M | | 9.2.1.40 | | YES | reject |
|---|---|---|---|---|---|---|
| Security Key | M | | 9.2.1.41 | The KeNB is provided after the key-generation in the MME, see TS 33.401 [15]. | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MME UE S1AP ID assigned by the MME. | YES | ignore |

FIG. 23E

| Management Based MDT Allowed | O | | 9.2.1.83 | | YES | ignore |
| --- | --- | --- | --- | --- | --- | --- |
| Management Based MDT PLMN List | O | | MDT PLMN List 9.2.1.89 | | YES | ignore |
| Additional CS Fallback Indicator | C-ifCSFBhighpriority | | 9.2.3.37 | | YES | ignore |
| Masked IMEISV | O | | 9.2.3.38 | | YES | ignore |
| Expected UE Behaviour | O | | 9.2.1.96 | | YES | ignore |
| ProSe Authorized | O | | 9.2.1.99 | | YES | ignore |
| UE User Plane CIoT Support Indicator | O | | 9.2.1.113 | | YES | ignore |
| V2X Services Authorized | O | | 9.2.1.120 | | YES | ignore |
| UE Sidelink Aggregate Maximum Bit Rate | O | | 9.2.1.122 | This IE applies only if the UE is authorized for V2X services. | YES | ignore |
| Enhanced Coverage Restricted | O | | 9.2.1.123 | | YES | ignore |
| Connection Maintenance Indication | O | | | | | |

FIG. 23F

X.X2.1.16  Connection Maintenance Indication

This IE enables the eNodeB to determine if the device should remain in RRC Connected mode for a period of time after receipt of the Access Stratum Release Assistance Indicator

| IE/Group Name | Presence | Range | IE type and reference | Semantics description | Criticality | Assigned Criticality |
|---|---|---|---|---|---|---|
| Connection Maintenance Indication | O | | ENUMERATED (maintain connection, release connection) | Indicates to the eNodeB whether the RRC Connection can be released immediately on receipt of Access Stratum (AS) Release Assistance Indicator from the UE (release connection), or whether the RRC Connection should be maintained for a preconfigured period of time after receipt of AS RAI (maintain connection). | – | |

FIG. 23G 9.1.7.2 DOWNLINK NAS TRANSPORT
This message is sent by the MME and is used for carrying NAS information over the S1 interface.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| NAS-PDU | M | | 9.2.3.5 | | YES | reject |
| Handover Restriction List | O | | 9.2.1.22 | | YES | ignore |
| Subscriber Profile ID for RAT/Frequency priority | O | | 9.2.1.39 | | YES | ignore |
| SRVCC Operation Possible | O | | 9.2.1.58 | | YES | ignore |
| UE Radio Capability | O | | 9.2.1.27 | | YES | ignore |
| DL NAS PDU Delivery Acknowledgment Request | O | | 9.2.3.48 | | YES | ignore |
| Enhanced Coverage Restricted | O | | 9.2.1.123 | | YES | ignore |
| Connection maintenance | O | | | | | |

FIG. 24A

X.X2.1.16 Connection Maintenance

This IE enables the eNodeB to determine whether or not the RRC connection should be held for a pre-configured period after transfer of the downlink NAS message in order to enable Mobile Traffic to be delivered, or whether the RRC connection can be released.

| IE/Group Name | Presence | Range | IE type and reference | Semantics description | Criticality | Assigned Criticality |
|---|---|---|---|---|---|---|
| Connection Maintenance | O | | ENUMERATED (maintain connection, do not maintain connection) | Indicates to the eNodeB whether the RRC Connection is to be maintained for a period following delivery of the DL NAS message | | |

FIG. 24B

INCREASING BATTERY PERFORMANCE FOR A DEVICE THAT USES POWER SAVING FEATURES

CROSS-REFERENCE TO RELATED APPLICATIONS

This application is a U.S. National Stage of International Patent Application No. PCT/EP2019/058595 filed Apr. 5, 2019, which claims priority to U.S. Provisional Application No. 62/654,086 filed Apr. 6, 2018, both of which are incorporated by reference herein as if reproduced in their entirety.

BACKGROUND

The Internet of Things (IoT) is a network of devices that are embedded with electronics, software, and sensors. IoT devices enable connectivity and communications to collect and exchange data for intelligent applications and services. IoT devices include smartphones, tablets, consumer electronics, vehicles, motors, and sensors capable of IoT communications. IoT devices are referred to as cellular IoT (CIoT) devices when the IoT devices are coupled by a wireless network. In this application, a CIoT device may also be referred to as User Equipment (UE), Terminal Equipment (TE), or Mobile Equipment (ME).

In order to increase the battery life of CIoT devices a feature known as Power Saving Mode (PSM) was introduced in the Third Generation Partnership Project (3GPP) Release 12 (Rel-12). PSM is applicable to many communications standards, such as 3GPP Global System for Mobile Communications (GSM) Enhanced Data rates for GSM Evolution (EDGE) Radio Access Network (RAN) (GERAN), 3GPP Universal Mobile Telecommunication System (UMTS) Terrestrial RAN (UTRAN), 3GPP Long Term Evolution (LTE), and other next generation (NG) communication standards, including the fifth generation (5G) System (5GS) which includes the 5G Core Network (CN) and e.g. the NG-RAN. PSM is controlled negotiated between the UE and the CN supporting the above access networks. The E-UTRAN is supported by the Evolved Packet Core (EPC) network in the Evolved Packet System (EPS). The NG-RAN is supported by the 5G CN in the 5GS. While protocols of the access stratum are terminated in an access network, the protocols of the non-access stratum (NAS) are terminated in the core network. The NAS protocols consist of mobility management protocols and session management protocols.

The power consumption of a UE in PSM deep sleep is similar to a UE that is powered off, but the UE in PSM deep sleep remains registered on the network. A UE in PSM deep sleep terminates listening to or avoids monitoring the network when entering PSM deep sleep. For example, the device could power off or disable receivers while remaining attached or registered with the network. Additionally, any timers and conditions held during power-off, e.g. NAS-level back-off timers, may apply in the same manner during the PSM. Furthermore, the UE is not required to signal to attach, to establish, or to re-establish packet data network (PDN) connections when the UE needs to listen to/monitor the network e.g., to wake up, to send a message or data after leaving PSM deep sleep. In some cases, the transition from PSM deep sleep to connected mode is triggered either by need for the UE to send mobile originated (MO) data or by the need to send, for example, a NAS mobility management protocol message (e.g. a location update message such as a Tracking Area Update (TAU) message when using the EPS) or other NAS message.

Presently, when a UE transitions from connected mode after finishing a data transfer, the UE enters an active time where the UE listens for paging messages prior to entering PSM deep sleep. Power consumed by the UE while listening to paging (i.e., waiting to receive mobile terminated (MT) data) is significant, especially when a UE battery is expected to last many years. Calculations have shown, for one class of device with a specific battery life, that power consumed when listening to paging represented 12% of the total battery life. In that regard, the more frequently the UE listens for paging, the greater the battery life which is wasted. Within this document PSM deep sleep might also be shorted to PSM or PSM mode.

Since there is a power consumption impact associated with listening to paging following each and every session (e.g. connected mode), it would be desirable for a UE that generates MO traffic only or mostly MO traffic (MMOT) and receives delay tolerable MT traffic to not be required to listen to paging after every session.

SUMMARY

Accordingly there are methods, a network node and a user equipment, UE, as detailed in the claims that follow.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates an exemplary implementation of an embodiment of the disclosure.

FIGS. 6A, 6B, 6C, 6D, 6E, and 6F illustrate an exemplary implementation of an embodiment of the disclosure.

FIGS. 8A, 8B, 8C, 8D, and 8E illustrate an exemplary implementation of an embodiment of the disclosure.

FIGS. 10A and 10B illustrate an exemplary implementation of an embodiment of the disclosure.

FIG. 11 illustrates an exemplary implementation of an embodiment of the disclosure.

FIGS. 12A and 12B illustrate an exemplary implementation of an embodiment of the disclosure.

FIG. 13 illustrates an exemplary implementation of an embodiment of the disclosure.

FIGS. 14A, 14B, 14C, and 14D illustrate an exemplary implementation of an embodiment of the disclosure.

FIG. 15 illustrates an exemplary implementation of an embodiment of the disclosure.

FIG. 16 illustrates an exemplary implementation of an embodiment of the disclosure.

FIG. 17 illustrates an exemplary implementation of an embodiment of the disclosure.

FIG. 18 illustrates an exemplary implementation of an embodiment of the disclosure.

FIGS. 19A, 19B, and 19C illustrate an exemplary implementation of an embodiment of the disclosure.

FIGS. 21A, 21B, 21C, 21D, 21E, and 21F illustrate an exemplary implementation of an embodiment of the disclosure.

FIGS. 23A, 23B, 23C, 23D, 23E, 23F, and 23G illustrate an exemplary implementation of an embodiment of the disclosure.

FIGS. 24A and 24B illustrate an exemplary implementation of an embodiment of the disclosure.

DETAILED DESCRIPTION

Figure 1:
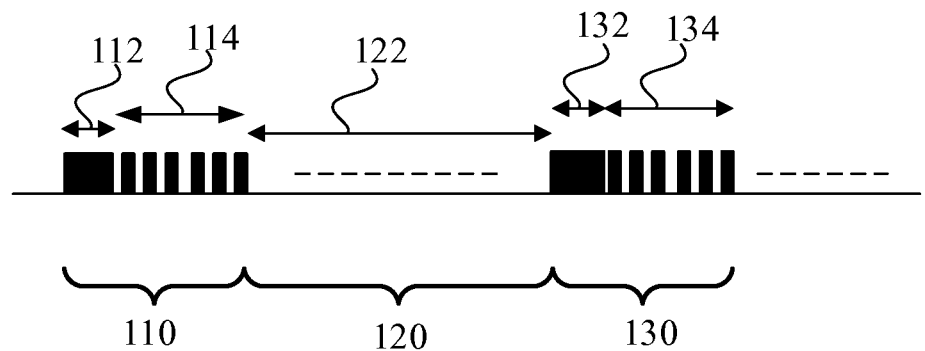
FIG. 1 is a diagram of a timeline illustrating transmit and receive periods of a PSM enabled UE transitioning through different modes.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Described herein are systems and methods to increase battery life of a UE by reducing the amount of time a UE spends in active time listening for paging messages following mobile originate (MO) or mobile terminated (MT) data transfers. A network node may receive, from a UE, a message including an identifier of the UE and a request to set the duration of an active time timer to zero. The network node may determine whether any MT traffic is available for the UE, and send a message to the UE including the duration of the active time timer or some other indicator to indicate to the UE whether or not MT data is awaiting transmission. Hence, instead of always listening during active time following MO transfers, the UE may listen during active time only when there is MT data to be transmitted to the UE.

The UE may send a mobility management message e.g., a Detach or De-Registration Request in 5G, Routing Area Update, Tracking Area update, Location area update, etc. to the network. Upon receipt of the message from the UE, if there is MT data pending, the network may perform procedures as described in U.S. patent application Ser. No. 14/834,216, (which is incorporated in its entirety herein by reference) using the following control messages e.g., Detach Accept or De-registration Accept in 5G, Routing Area Update Accept, Tracking Area update Accept, Location area update Accept, etc. to send pending MT data.

As used herein, the term UE can refer to mobile devices such as mobile telephones, personal digital assistants, handheld or laptop computers, vehicle or modem within a vehicle, Internet of Things (IoT) devices and similar devices that have telecommunications capabilities. Such a UE might comprise a wireless device and its associated embedded Universal Integrated Circuit Card (eUICC) that includes a Subscriber Identity Module (SIM) application, a Universal Subscriber Identity Module (USIM) application, or a Removable User Identity Module (RUIM) application or might comprise the device itself without such a card. The term "UE" may also refer to devices that have similar capabilities but that are not transportable, such as fixed line telephones, desktop computers, or set-top boxes. The term "UE" can also refer to any hardware or software component that can terminate a Session Internet Protocol (SIP) session.

As used herein, operator initiated MT traffic includes but is not necessarily limited to MT traffic that may be generated by the cellular operator, e.g. an SMS message that is sent to the device to cause its configuration to be changed. Furthermore, a network or network node may be a collection or sub-collection of entities ranging from Evolved Node B (eNB), Serving General Packet Radio Service (GPRS) Support Node (SGSN), Gateway GPRS Support Node (GGSN), Mobile Management Entity (MME), Packet Gateway (P-GW), Serving Gateway (S-GW), Access and Mobility Management Function (AMF), Session Management Function (SMF), etc. It is worth noting that MME is a fourth generation function that may perform Mobility, Authentication, and Session Management. In 5G or NG, the MME may be split into AMF and SMF. Hence, AMF, SMF, and MME may be interchanged herein.

A UE capable of PSM may only be reachable for MT services during a time period that the UE is in connected mode and during an idle mode immediately after the connected mode. The idle mode may include a time period known as active time which follows a time period that the UE is in the connected mode. The UE may enter PSM when the active time time period expires. PSM may be well suited for applications that initiate MO data, such as a location (geographic) reporting application, a smart meter application reporting electricity usage data, etc., where the MO data may be sent using short message service (SMS) or via IP or non-IP data connection. The active time time period may be represented by a timer known as an active time timer. The active time timer may also be referred to as T3324 specified in 3GPP TS 24.008. The UE may request an active time timer value during Attach (i.e., when the UE performs an initial registration to the network) or during TAU to a network entity, such as an MME or SGSN. The MME/SGSN may determine whether the UE may use PSM and may inform the UE of the active time timer value that should be used if the UE is allowed to use PSM. The MME/SGSN may take the UE requested active time timer value and any local MME/SGSN configuration into account for determining the active time timer value that may be allocated to the UE. Based on 3GPP Rel-12, a minimum recommended length for the active time timer is a time allowing for a 'msg waiting indication' in the MME/SGSN to trigger an SMS Center (SMSC) via a home subscriber server (HSS) to deliver an SMS to the MME/SGSN, e.g. two discontinuous reception (DRX) cycles plus 10 seconds. DRX is another method used in mobile communications to conserve battery life of the UE. For DRX, the UE and the network may negotiate periods in which the UE will listen to control channels, during other DRX times where the UE is not listening to control channels, the UE may turn its receiver off and enter a low power state.

FIG. 1 is a diagram of a timeline of a PSM enabled UE transitioning through different modes. As shown in FIG. 1, a UE may change operation mode over a period of time, e.g. a first time period 110 to a second time period 120 to a third time period 130. The first time period 110 may be triggered by an MO data transfer event (e.g. to transmit an SMS message) or by a TAU message transfer event e.g. periodic TAU. The first time period includes a connected time period 112 and an active time timer time period 114. The active time timer time period 114 may be received from the MME/SGSN at Attach or previous TAU procedures. During the active time timer time period 114, the UE may be in an idle state and listen for paging messages. The second time period 120 may start after expiration of the active time timer time period 114. During the second time period 120 the UE may be in PSM deep sleep. A length of the second time period may be determined according to a timer known as periodic TAU timer 122. The periodic TAU timer may also be referred to as T3412 as specified in 3GPP TS 24.008. The UE may be configured to exit PSM deep sleep at the end of the periodic TAU timer time period 122 to the third time period 130. The third time period 130 may include a connected mode 132 and a active time timer time period 134 and may be in device reachable state for the MT traffic, transmit MO traffic, etc.

The periodic TAU may be used to inform the network that the UE still needs service and that the UE's contexts within the network are to be maintained. The periodic TAU timer of the UE may start after the last TAU or data transfer event and the periodic TAU message may be sent when the periodic TAU timer expires. Both the periodic TAU timer and the active time timer values may be set by the MME/SGSN. In some embodiments, a UE capable of PSM may request the periodic TAU timer and the active time timer values according to UE requirements. Hence, for an application generating an MO message with a known periodicity (e.g. an asset tracking application which sends location reports every 24 hours), the UE may request a periodic TAU timer value to be larger than this time period (e.g. 25 hours). Noting that the periodic TAU timer T3412 is reset after completion of every data session or TAU session. This will save power in the UE by avoiding unnecessary TAU messaging. A UE can request a new value for the periodic TAU timer during Attach or TAU procedures. As specified in 3GPP TS 24.008, a value range for the active time timer may be 0 seconds up to maximum of 3.1 hours and a value range for periodic TAU timer may be 0 to 413 days. Other values of active time timer and periodic TAU timer may be used as appropriate.

PSM may be used by UEs using Packet Switched (PS) domain, SMS and Internet Protocol (IP) Multimedia Subsystem (IMS). In LTE/Evolved UTRAN (E-UTRAN), SMS can be sent and received over the radio control channel or they can be sent using IMS messaging. Due to the fact that the SMS is a store and forward procedure, indications are specified in the network that indicate if a message cannot be delivered because the UE could not be reached (i.e., the UE is in the PSM deep sleep), which then enables the delivery to be reattempted. Additionally, the indications may include a Message Waiting Indication (MWI) that is stored in the Mobile Switching Center (MSC)/Visitor Location Register (VLR), SGSN, MME and/or an indication that is stored in the Home Location Register (HLR)/HSS indicating which SMSC should be notified when the UE becomes available again.

In an embodiment, an active time timer may start at the end of the connected mode, for example following transition from connected to idle. For applications that generate MO traffic, one instance of listening to paging is when a cellular operator wishes to contact the UE to enable the cellular operator to deliver a message to the UE (e.g. SMS message) for a configuration update. Certain applications may not need to receive MT traffic and the UE may request from the MME to set the active time timer value to zero. If the MME has been configured to disregard the UE requested value in all or some circumstances and sets a pre-configured value from the MME instead, then the UE will be required to monitor the network for an operator defined and potentially non-zero active time timer period. Furthermore, the cellular operator might choose to disallow the requested active time timer value of zero if the cellular operator has a requirement to send MT configuration messages to the UE.

Figure 2:
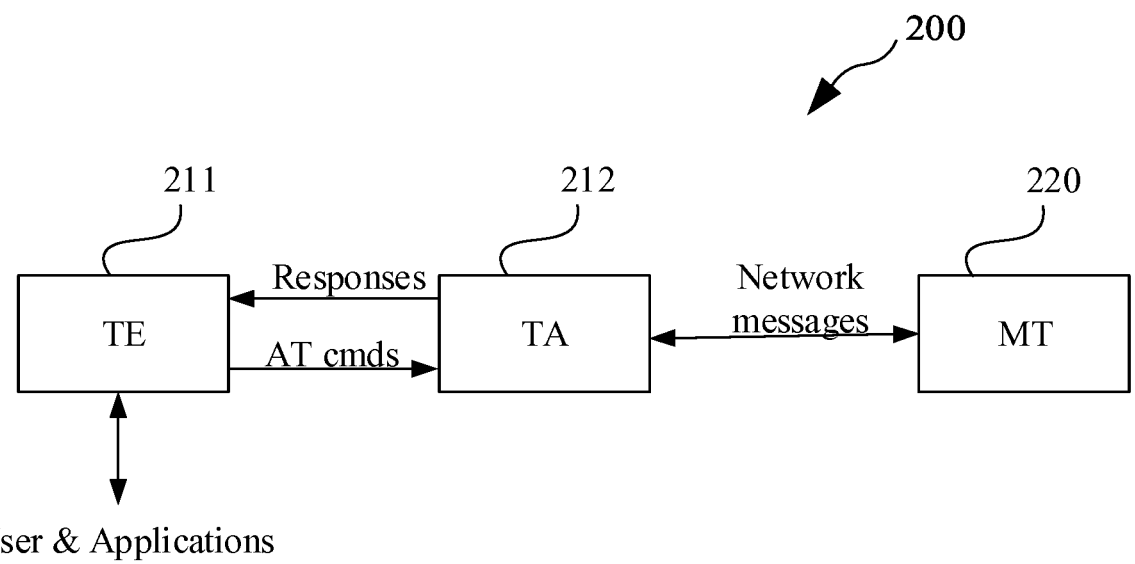
FIG. 2 is a block diagram of a user equipment architecture according to an embodiment of the disclosure.

FIG. 2 is a block diagram of a UE architecture 200 for attention (AT) commands according to an embodiment of the disclosure. The UE architecture 200 may include a mobile termination (MT) 220 that communicates with terminal adaptor (TA) 212. In an embodiment, TA 212 may communicate with terminal equipment (TE) 211 using AT commands (designated as "AT cmds" in FIG. 2).

AT commands may enable upper layers of a TE (e.g. application layer) to write data, read data, or request execution of a procedure by lower layers of the TE (e.g. modem chipset). The lower layer may provide final, and/or intermediate responses to AT commands. The lower layers may provide unsolicited codes as responses, e.g. incoming on call announcement (i.e., RING) or an equivalent when an incoming call is detected. The TE may register for receiving certain unsolicited codes/responses by means of AT commands.

Figure 3:
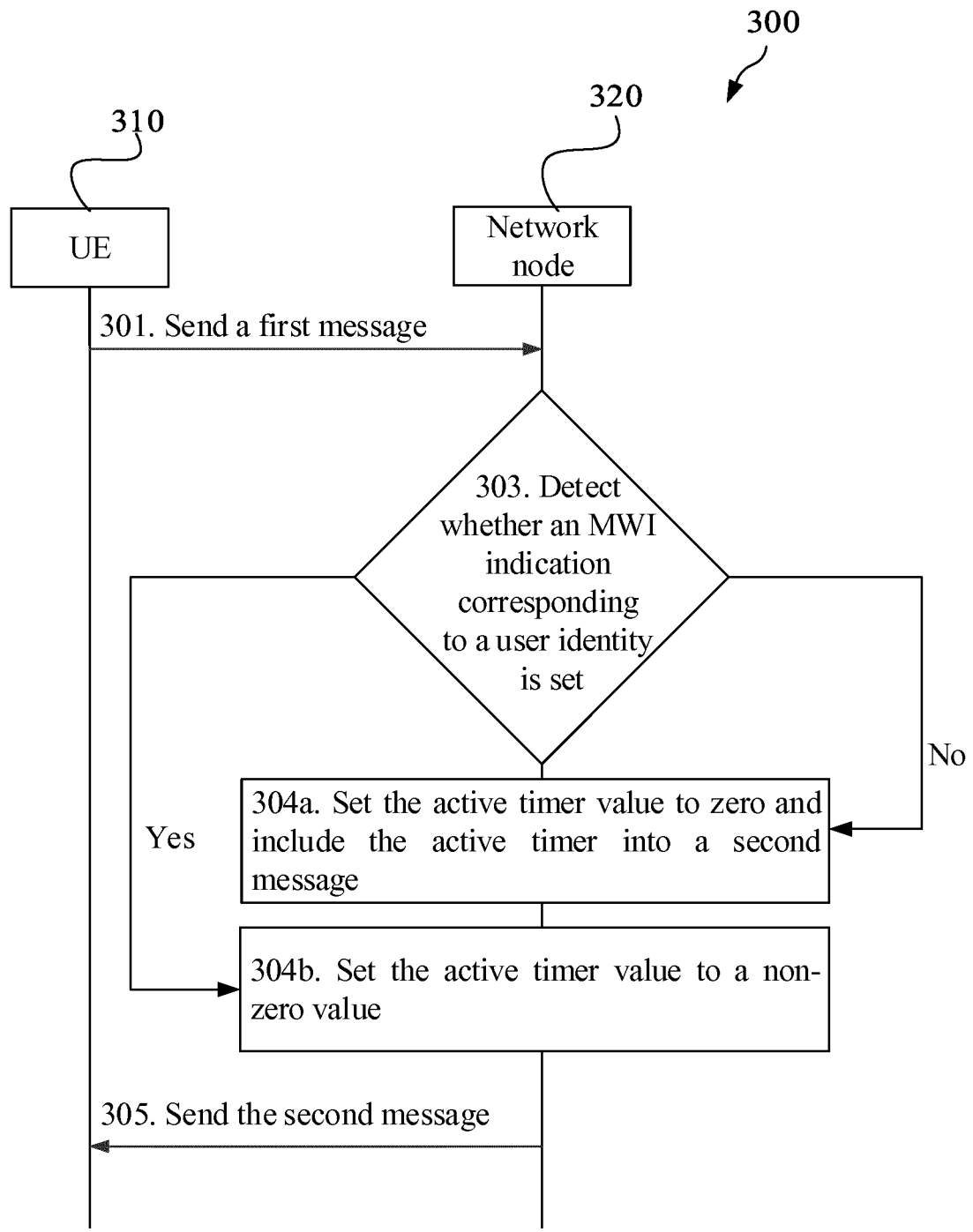
FIG. 3 is a flow diagram for setting an active time timer according to an embodiment of the disclosure.

FIG. 3 is a flow diagram 300 for setting an active time timer T3324 according to an embodiment of the disclosure. The flow diagram 300 may be implemented between a UE 310 and a network node 320.

At step 301, the UE 310 may send a first message including a user identity to the network node 320. The user identity corresponds to the UE 310. The first message may include an Attach request, a Routing Area Update (RAU) request, a TAU request and/or a Location Area Update (LAU) request. Other types of requests may be included in the first message as necessary. Further, the first message may include an indication that the UE 310 requests use of PSM and a request to set the active time timer value to be zero.

At step 303, the network node 320 may determine whether an MWI indication corresponding to the user identity of the UE 310 is set. In an embodiment, the MWI indication has been expanded to be a more generic term that implies there is data waiting for the UE, and the data may be SMS or MT Packet Data Unit (PDU). In some embodiments, the MWI indication has also been expanded to include a sub-type of data e.g. operator, application, user etc. If and when a UE receives this sub-type it can make a more informed decision if the active time timer should be run or not.

At step 304a, the network node 320 sets the active time timer value to zero and includes the active time timer value in a second message if the MWI indication corresponding to the user identity is not set.

At step 304b, the network node 320 disregards the request for the active time timer value to be set to zero if the MWI indication corresponding to the user identity is set. In this situation, the network node 320 may set the active time timer value to a predetermined value greater than zero.

The second message may be an Attach accept, an RAU accept, a TAU accept and/or a LAU accept or S1-AP message (or 5G equivalent). In some embodiments, other data may be included in the second message as necessary.

At step 305, the network node 320 may send the second message to the UE 310.

FIG. 4 illustrates an exemplary implementation 400 of an embodiment of the disclosure. The implementation 400 corresponds to an implementation specified by 3GPP TS 23.682, with changes proposed herein denoted by underlined text. The implementation is a possible solution out of many to implement the embodiments described herein.

Figure 5:
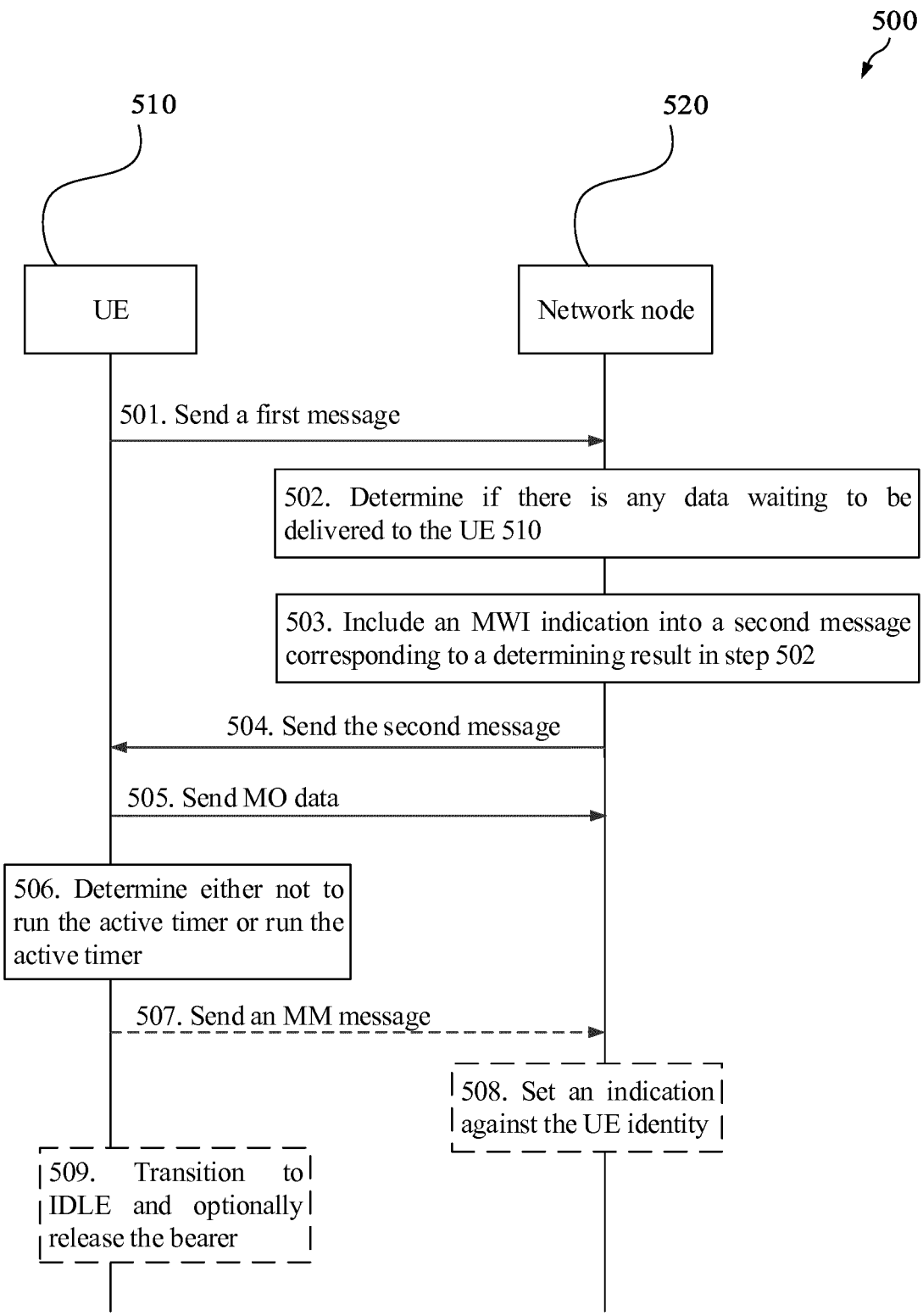
FIG. 5 is a flow diagram for sending a Mobility Management (MM) Accept message according to an embodiment of the disclosure.

FIG. 5 is a flow diagram 500 for sending a Mobility Management (MM) Accept message according to an embodiment of the disclosure. The flow diagram 500 may be implemented between a UE 510 and a network node 520.

At step 501, the UE 510 may send a first message optionally including either or both a user identity and active time timer to the network node 520. The user identity corresponds to the UE 510. In an embodiment, the first message may include a Service Request, Attach request, an RAU request, a TAU request, and/or a LAU request. Other requests may be included in the first message as necessary.

At step 502, the network node 520 may determine if there is any data (i.e., downlink data such as SMS or MT PDU) waiting to be delivered to the UE 510. If data is waiting the MWI indication is set to True and if data is not waiting the MWI indication is set to False.

At step 503, the network node 520 may include an indication e.g. MWI indication) in a second message corresponding to a determining result in step 502. For example, the MWI indication may be set to "TRUE" when there is data waiting (e.g. SMS, MT PDU etc) to be delivered and the MWI indication may be set to "FALSE" when there is no data waiting to be delivered. In an embodiment, the second message may include but not limited to an Attach accept, an RAU accept, a TAU accept, and/or a LAU accept, or S1-AP message (or 5G equivalent) etc. In some embodiments, other data may be included in the second message as necessary.

At step 504, the network node 520 may send the second message to the UE 510.

At step 505, the UE 510 may send MO data (i.e., SMS, PDU) or MO message (e.g. periodic TAU message, etc.) to the network node 520 after receiving the second message.

At step 506, the UE 510 may determine not to run the active time timer and transition to PSM deep sleep when the MWI indication is set to "FALSE" and run the active time timer and transition to PSM deep sleep when active time timer expires when the MWI indication is set to "TRUE" in the optional indication.

In an optional step 507, the UE 510 may send a Mobility Management (MM) message including an indication (e.g. PSM indication) indicating that the UE 510 is entering into PSM.

In an optional step 508, the network node 520 may set an indication that the UE 510 has entered PSM deep sleep after receiving the MM Request message including the PSM indication from the UE 510. Furthermore, context data (i.e., network registration information of UE 510) may be saved in the network node 520. While the UE 510 is in PSM deep sleep, if the network node 520 receives any Mobile Terminated (MT) traffic for the UE 510 an indication may be returned to the sender indicating that the UE 510 is unreachable.

In optional step 509, the UE 510 transitions to idle state and may release the bearer.

In an embodiment, the network node 520 may use the following process to determine whether there is any downlink data (e.g. SMS or MT PDU) pending. In an embodiment, the network node 520 may set an SMSC address or an origination address in a short message to be used to distinguish the type of traffic (see Table 1). Distinguishing the type of traffic may require configuration of information in an entity that performs the determining, for example the network node 520. A set of parameters that can be used to distinguish the type of traffic received is shown in Table 1 below. Information could be stored in the following (but not limited to): network node 520, UE 510, a UICC application, a TE, etc.

TABLE 1

| Information element to analyse in the MT traffic | Address (value[s]) received in the proceeding column) | Sub-type of traffic (service type) |
| --- | --- | --- |
| SMSC address | A ($1^{st}$ address) | Operator ($1^{st}$ service type) |
|  | B ($2^{nd}$ address) | Application ($2^{nd}$ service type) A (1st application type) |
|  | C | User ($3^{rd}$ service type) |
| MO short message address | D | Operator |
|  | E | Application |
|  | F | User |
| Origination IP address | G | Operator |
|  | H | Application A |
|  | I | user |
| Origination port | J | Operator |
|  | K | Application |
|  | L | User |
| Transport protocol | M | Operator |
| Destination IP address | N | User |
| Destination port | O | Application |

The address could be a single entry, multiple entries, or a range of addresses. Letters are used in the Table 1 for illustrative purposes to represent the address(es).

In an embodiment, the network node 520 may receive the MT data (e.g. a short message) and may be unable to deliver the MT data to the UE 510 (e.g. UE 510 is the PSM). The network node 520 may analyze, for example, the SMSC address in the MT data and match the SMSC address to an address stored in memory of the network node 520 (e.g. Address A) (see table 1). The network node 520 may determine that the MT data is operator short message traffic based on the matching result.

Similar operations can be performed for other types of traffic e.g IP traffic. Table 1 illustrates a number of information elements (IE) that could be analyzed ($1^{st}$ column) and then matched against possible entries that could appear in that IE (column 2). If a match is found then a sub-type is determined (column 3). This sub-type maybe then communicated to the UE e.g. in step 504 of FIG. 5. The UE then use this sub-type, if received, to determine if active time timer T3324 should be run or not e.g. Table 2.

In an embodiment, the following Table 2 may be stored in the UE 510 and "Run active time timer" or "Not run active time timer" action may be performed based on the MWI indication status (e.g., "TRUE" or "FALSE"). The action to perform may either run active time timer (e.g. an active time timer value greater than zero was received) or not run active time timer. For example, if an MWI indication is set for a certain data type, e.g. Operator MT SMS, the action to perform may be 'run active time timer.' In another example, the UE is informed that "user" SMS is waiting, however the UE never expects to receive "user" SMS so ignores active time timer and transitions to PSM deep sleep. Such an SMS could be seen as an attack to run the battery down as the device would have to consume power waiting for the SMS to be delivered. As shown in Table 2, the first column represents types of traffic e.g. Operator MT SMS, Operator MT data, etc., and the second column represent an action to perform e.g. Run active time timer, Not run active time timer, etc.

TABLE 2

| Data type waiting | Action to perform |
| --- | --- |
| Operator MT SMS | Run active time timer |
| Operator MT data | Not run active time timer |
| 1$^{st}$ application (Application a) MT data | Not run active time timer |
| 2$^{nd}$ application (Application b) MT SMS | Run active time timer |
| User data | Run active time timer |
| User SMS | Not run active time timer |
| MT data | Run active time timer |
| MT SMS | Run active time timer |
| MT PDU | Not run active time timer |

FIGS. 6A, 6B, 6C, 6D, 6E, and 6F illustrate an exemplary implementation 600 of an embodiment of the disclosure. The implementation 600 corresponds to an implementation specified by 3GPP TS 24.301, with changes proposed herein denoted by underlined text. The implementation is a possible solution out of many to implement the embodiments described herein.

Figure 7:
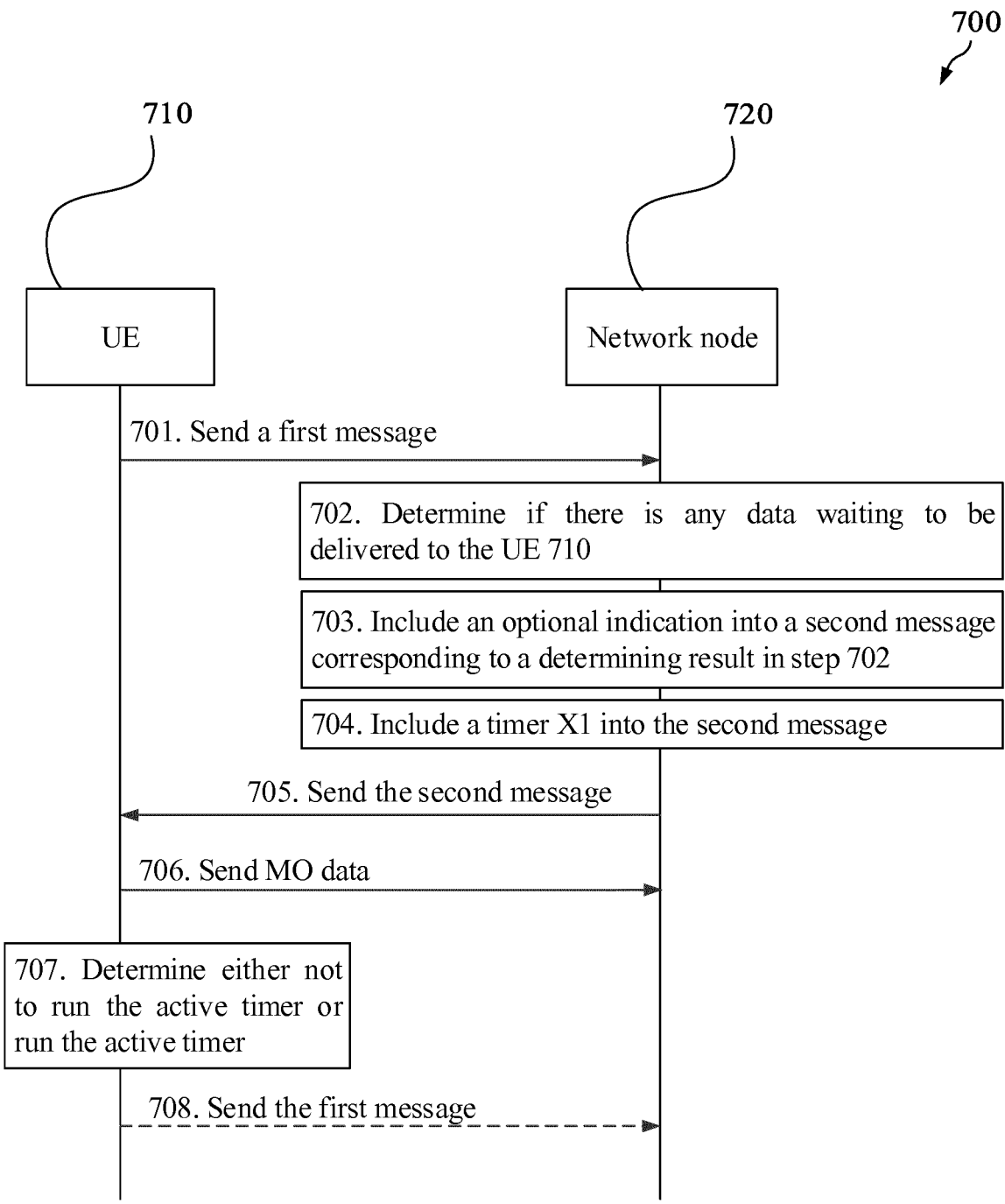
FIG. 7 is a flow diagram for sending an enhanced MM Accept message according to an embodiment of the disclosure.

FIG. 7 is a flow diagram 700 for sending an enhanced MM Accept message according to an embodiment of the disclosure. The flow diagram 700 may be implemented between a UE 710 and the network node 720.

At step 701, the UE 710 may send a first message optionally including a user identity to the network node 720. The user identity corresponds to the UE 710. In an embodiment, the first message may include a Service Request, Attach request, an RAU request, a TAU request, REGISTER and/or a LAU request. Other requests may be included in the first message as necessary.

At step 702, the network node 720 may determine if there is any data (e.g. downlink data such as SMS or MT PDU) waiting to be delivered to the UE 710.

At step 703, the network node 720 inserts an optional indication into a second message when there is data waiting for the UE 710. In an embodiment, the second message includes but not limited to an Attach accept, an RAU accept, a TAU accept, REGISTER ACCEPT and/or a LAU accept, or S1-AP message (or 5G equivalent). In some embodiments, other data may be included in the second message as necessary. In an embodiment, the optional indication indicates "MMOT traffic supported" has been set or "MMOT traffic supported" has not been set. The "MMOT traffic supported" indicates that the MT data may be stored in the network node 720 for a pre-determined time or in another network node in the network or MMOT means that the device generates mobile originated traffic and does not want to receive MT traffic, however it is prepared to receive MT traffic that has originated from the operator e.g. SMS OTA. Elsewhere in the document there are descriptions that describe how traffic can be characterized as being from the operator. MMOT may also be referred to herein as Delay-tolerable Traffic or Delaytolerable MT Traffic.

At step 704, the network node 720 may insert a timer X1 into the second message and may insert active time timer. The network node 720 may set to start Timer X1 either upon sending this message, upon expiry of active time timer or upon completion of the mobility management procedure. In one implementation, when Timer X1 is started the network node 720 may assume that the UE 710 may use the active time timer that has also been inserted into the same message for the period of time of Timer X1. The network node 720 may also assume not to expect the receipt of an active time timer value from the UE 710 for the period of Timer X1. Alternatively, Timer X1 may include a value indicating the number of mobility management messages that the UE may send not containing an active time timer value, however the UE 710 may still use the same active time timer value as was included with the Timer X1 value. Yet another implementation, Timer X1 indicates to the UE 710 how long it can ignore active time timer if MMOT is true.

At step 705, the network node 720 may send the second message to the UE 710.

At step 706, the UE 710 may send MO data to the network after receiving the second message.

At step 707, the UE 710 may determine, based on the optional indication status, to ignore the active time timer and enter PSM deep sleep or to execute active time timer and upon expiration of active time timer perform PSM deep sleep. The determination to ignore the active time timer occurs when the optional indication indicates the MMOT traffic is supported and the determination to execute the active time timer occurs when the optional indication indicates the MMOT traffic is not supported. If the UE 710 does ignore active time timer, sometime later it needs to decide to execute active time timer so that it may receive the MT traffic.

At step 708, the UE 710 may repeat sending the first message when the periodic TAU timer expires or when the Timer X1 received from the second message expires. In an embodiment, the timer X1 may be stored in memory of the UE 710 or on the UICC application (and subsequently read into UE 710 memory). In this way, the UE 710 may de-couple the times at which the UE 710 listens for MT traffic from the times at which the MO data transfers or TAU messages are sent. Hence, rather than listen for MT traffic after every MO session, the UE 710 may listen for MT traffic at a less frequent rate that is dictated by the needed acceptable delay in sending the MT traffic. In an embodiment, the Timer X1 may also indicate to the UE that for the period of Timer X1 the UE does not need to include the active time timer (e.g. timer UE needs to monitor paging channel) in messages to the network (e.g. Service Request, REGISTER, Location Update, Tracking Area Update, etc.) or Timer X1 may be a value that indicates the number of messages that may be sent to the network that do not include the active time timer. In both of these embodiments, the active time timer value used by the UE is the same value that was received in the message that contained Timer X1. This means that the UE sends and receives less information elements, bytes, to and from the network consuming less power.

FIGS. 8A, 8B, 8C, 8D, and 8E illustrate an exemplary implementation 800 of an embodiment of the disclosure. The implementation 800 corresponds to an implementation specified by 3GPP TS 24.301, with changes proposed herein denoted by underlined text. The implementation is a possible solution out of many to implement the embodiments described herein.

Figure 9:
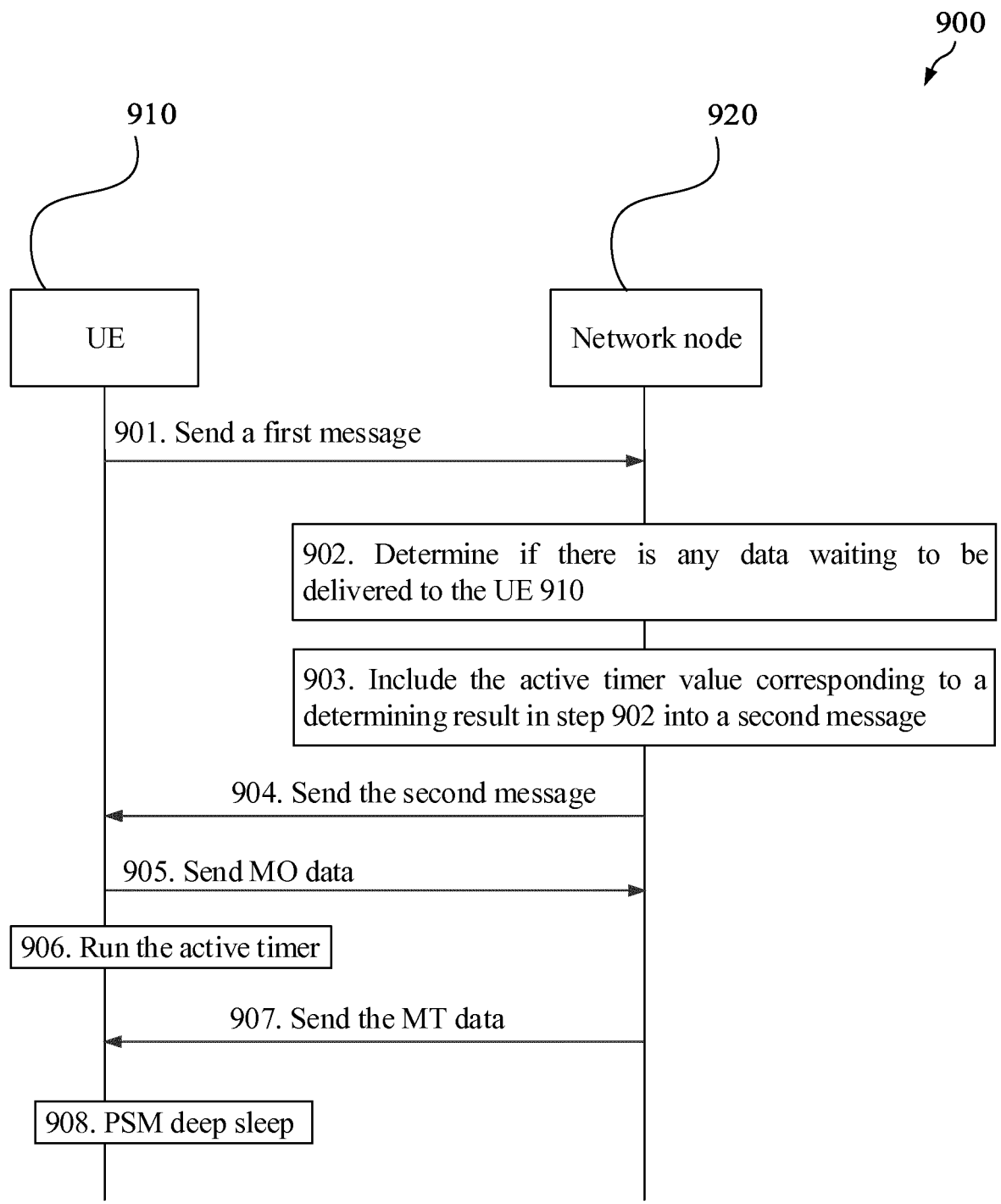
FIG. 9 is a flow diagram for indicating MMOT Traffic Accept message according to an embodiment of the disclosure.

FIG. 9 is a flow diagram 900 for indicating MMOT Traffic Accept message according to an embodiment of the disclosure. The flow diagram 900 may be implemented between a UE 910 and a network node 920.

At step 901, the UE 910 may send a first message optionally including a user identity to the network node 920. The user identity corresponds to the UE 910. In an embodiment, the first message may include but not limited to a Service Request, Attach request, an RAU request, REGISTER, a TAU request and/or a LAU request. Other types of requests may be included in the first message as necessary. Furthermore, the UE 910 may include an optional indication indicating that the UE 910 supports the MMOT.

At step 902, the network node 920 may determine if there is any data (i.e., downlink data such as SMS or MT PDU) waiting to be delivered to the UE 910. In this embodiment, if there is any MMOT data to be sent to UE 910, may be implemented using the steps denoted in the description of Table 1.

At step 903, an active time timer value may be determined according to Table 3 and included in a second message. Table 3 is an extension of Table 1, and in addition to the columns shown in Table 1, Table 3 includes a fourth column indicating possible active time timer values according to the sub-type of determined MMOT data.

At step 904, the network node 920 may send the second message to the UE 910.

At step 905, the UE 910 may send MO data (e.g. SMS, IP PDU, non-IP PDU or periodic TAU message) to the network node 920 after receiving the second message.

At step 906, the UE 910 may start a time using the active time timer value received from the network node 920.

At step 907, the network node 920 may send MT data (e.g. SMS or MT PDU) to the UE 910 after the UE starts active time timer. The MT data may be transmitting according to the procedures of U.S. patent application Ser. No. 14/834,216 or in other mobility management messages, e.g., Attach Accept, RAU Accept, TRAU Accept, LAU Accept, etc. and the 5G equivalent of messages that acknowledge REGISTRATION, periodic updates and updates due to moving across mobility management areas, e.g., Downlink NAS transport.

At step 908, the UE 910 may PSM deep sleep after the set active time timer expires.

FIGS. 10A and 10B illustrate an exemplary implementation 1000 of an embodiment of the disclosure. The implementation 100 corresponds to an implementation specified by 3GPP TS 23.682, with changes proposed herein denoted by underlined text. The implementation is a possible solution out of many to implement the embodiments described herein.

FIG. 11 illustrates an exemplary implementation 1100 of an embodiment of the disclosure. The implementation 1100

TABLE 3

| Information element to analyze | Address | Sub-type of traffic (service type) | Active time timer value (a timer value) |
|---|---|---|---|
| SMSC address (1$^{st}$ information element) | A | Operator (1$^{st}$ service type) | X (1$^{st}$ value) |
| | B | Application A (2$^{nd}$ service type) | Y (2$^{nd}$ value) |
| | C | User (3$^{rd}$ service type) | Z (3$^{rd}$ value) |
| Mobile Originated Short Message address (2$^{nd}$ information element) | D | Operator | K |
| | E | Application | L |
| | F | User | Y |
| Origination IP address (3$^{rd}$ information element) | G | Operator | XX |
| | H | Application A | YY |
| | I | user | XY |
| Origination port (4$^{th}$ information element) | J | Operator | XC |
| | K | Application | CC |
| | L | User | DD |
| Transport protocol (5$^{th}$ information element) | M | Operator | SS |
| Destination IP address (6$^{th}$ information element) | N | User | AA |
| Destination port (7$^{th}$ information element) | O | Application | ZZ |

Certain addresses and parts are shown in Table 3. In some embodiments, other parts, addresses, and/or data may be used in determining the subtypes of traffic and/or the active time timer. One will appreciate that the letters that appear in the 2$^{nd}$ and 4$^{th}$ column are purely for illustrative purposes and are used to demonstrate that different data maybe contained however the data maybe the same. The letters in column 2 represent data, and the data maybe textual, numeric, and alphanumeric. The data maybe a single, group of, range of entries or any combination thereof.

In an embodiment, when there is more than one sub-type of traffic, the network node 920 may set the highest possible active time timer value as the active time timer value for the UE 910 from Table 3.

corresponds to an implementation specified by 3GPP TS 23.401, with changes proposed herein denoted by underlined text. The implementation is a possible solution out of many to implement the embodiments described herein.

FIGS. 12A and 12B illustrate an exemplary implementation 1200 of an embodiment of the disclosure. The implementation 1200 corresponds to an implementation specified by 3GPP TS 23.301, with changes proposed herein denoted by underlined text. The implementation is a possible solution out of many to implement the embodiments described herein.

FIG. 13 illustrates an exemplary implementation 1300 of an embodiment of the disclosure. The implementation 1300 corresponds to an implementation specified by 3GPP TS 24.008, with changes proposed herein denoted by underlined text. The implementation is a possible solution out of many to implement the embodiments described herein.

In an embodiment, the active time timer T3324 may be triggered/started with a first TAU message or data packet transfer from the UE to the network node. The active time timer value may be agreed at a previous communication with the network node or configured when the UE registers with the network. Furthermore, the following two cases will occur in this situation. When the UE sends an uplink packet (e.g. MO data or periodic TAU message, etc.), the active time timer may be started and if the active time timer expires before the UE sends all of the uplink packets, the UE may enter PSM deep sleep when there are no more data packets to send. If active time timer does not expire before the UE sends all of the uplink packets, the UE may transition from connected mode to idle mode and PSM deep sleep when the active time timer expires.

In an embodiment, with respect to FIGS. 14A-18, a control plane optimization data transfer procedure may be modified to further optimize the idle and PSM deep sleep transition procedure. Control plane optimization may include that data is carried in a NAS message. Therefore, it may be possible to re-use NAS security, avoid using access stratum security configurations and further avoid use of configurations associated with establishing a user plane connection. These actions may result in power consumption improvement. In addition, a Release Assistance Indicator (RAI) may be included by the UE to inform the network node whether the session comprises just one uplink packet, an uplink packet followed by a downlink packet, or some other combination of uplink and/or downlink packets. This information may be used by the network node to determine the earliest possible time to release a Radio Resource Control (RRC) connection. In this embodiment, the control plane optimization data transfer procedure may be modified such that when the network node releases an S1 connection, the network node may provide an indication known as PSM State Transition Indicator within an information element e.g NAS container, to an access node, such as an eNB. One of the meanings of the PSM state transition indicator indicates to the receiving entity what state the receiving entity may transition to upon receiving an RRC message e.g. RRC connection release. The access node may then pass the network node provided indication onto the UE in the RRC connection release message to indicate to the UE to remain in idle state for an assigned active time timer or transition direct to PSM deep sleep. The network node may determine to set the PSM State Transition Indicator based on UE's previous indications of "MO originated sessions only" and uplink/downlink packets to be received/delivered. Note that within this application S1 procedures are related to 4G, however the functionality can be equally applied to 5G system that uses N2 procedures.

FIGS. 14A, 14B, 14C, and 14D illustrate an exemplary implementation 1400 of an embodiment of the disclosure. The implementation 1400 corresponds to an implementation specified by 3GPP TS 23.401, with changes proposed herein denoted by underlined text. The implementation is a possible solution out of many to implement the embodiments described herein.

FIG. 15 illustrates an exemplary implementation 1500 of an embodiment of the disclosure. The implementation 1500 corresponds to an implementation specified by 3GPP TS 36.413, with changes proposed herein denoted by underlined text. The implementation is a possible solution out of many to implement the embodiments described herein.

FIG. 16 illustrates an exemplary implementation 1600 of an embodiment of the disclosure. The implementation 1600 corresponds to an implementation specified by 3GPP TS 24.301, with changes proposed herein denoted by underlined text. The implementation is a possible solution out of many to implement the embodiments described herein.

In another embodiment, resetting the periodic TAU timer configured in the UE may be performed after an initial Attach and after completion of a TAU procedure (or RAU procedure). Hence, the periodic TAU timer may not be reset after completion of each data transfer. Each time the UE performs the periodic TAU procedure, the UE may remain in an idle state for a time indicated in the active time timer, during which the UE may listen for paging and MT messages from the operator. When the UE generates only MO data, the UE may directly transition from connected to PSM deep sleep following RRC connection release.

In this embodiment, a UE may receive MT traffic generated by the operator with a given configurable maximum latency that is ultimately set by the operator (i.e. that is determined by the periodic TAU timer). In addition, the UE may avoid unnecessarily listening for MT traffic on other occasions when sending MO traffic, and avoids the associated power consumption costs.

FIG. 17 illustrates an exemplary implementation 1700 of an embodiment of the disclosure. The implementation 1700 corresponds to an implementation specified by 3GPP TS 23.682, with changes proposed herein denoted by underlined text. The implementation is a possible solution out of many to implement the embodiments described herein.

FIG. 18 illustrates an exemplary implementation 1800 of an embodiment of the disclosure. The implementation 1800 corresponds to an implementation specified by 3GPP TS 24.301, with changes proposed herein denoted by underlined text. The implementation is a possible solution out of many to implement the embodiments described herein.

In another embodiment, when a UE indicate to the network during Attach, TAU procedure, RAU procedure, etc. that the UE or its application only needs MO sessions, the network node may identify that the only MT traffic transmitting to the UE is MT traffic the operator/network may generate. If the operator/network has none of the MT traffic pending, it may be possible to expedite the return of the UE to PSM, i.e., without triggering active time timer. However, if the operator/network generated MT traffic is pending, then the network node may initiate one or any combination of foregoing embodiments described in this disclosure.

In some embodiments, the UE indicating to the network node a specific requirement, such as, only needing MO sessions or that MMOT traffic will be supported, etc. may be done using AT commands. For an example a "set" AT command may be used to inform the modem to inform the network of the UE's configuration to only expect to participate in MO sessions, unless the operator needs to originate a mobile terminated session.

An existing "set" AT command may be modified or a different "set" AT command may be created. FIGS. 19A, 19B, and 19C illustrate an exemplary implementation 1900 of an embodiment of the disclosure. Changes proposed herein are denoted by underlined text. The implementation is a possible solution out of many to implement the embodiments described herein. A different "set" AT command may be created providing the information needed to inform the network of the UE's preference or configuration.

Figure 20:
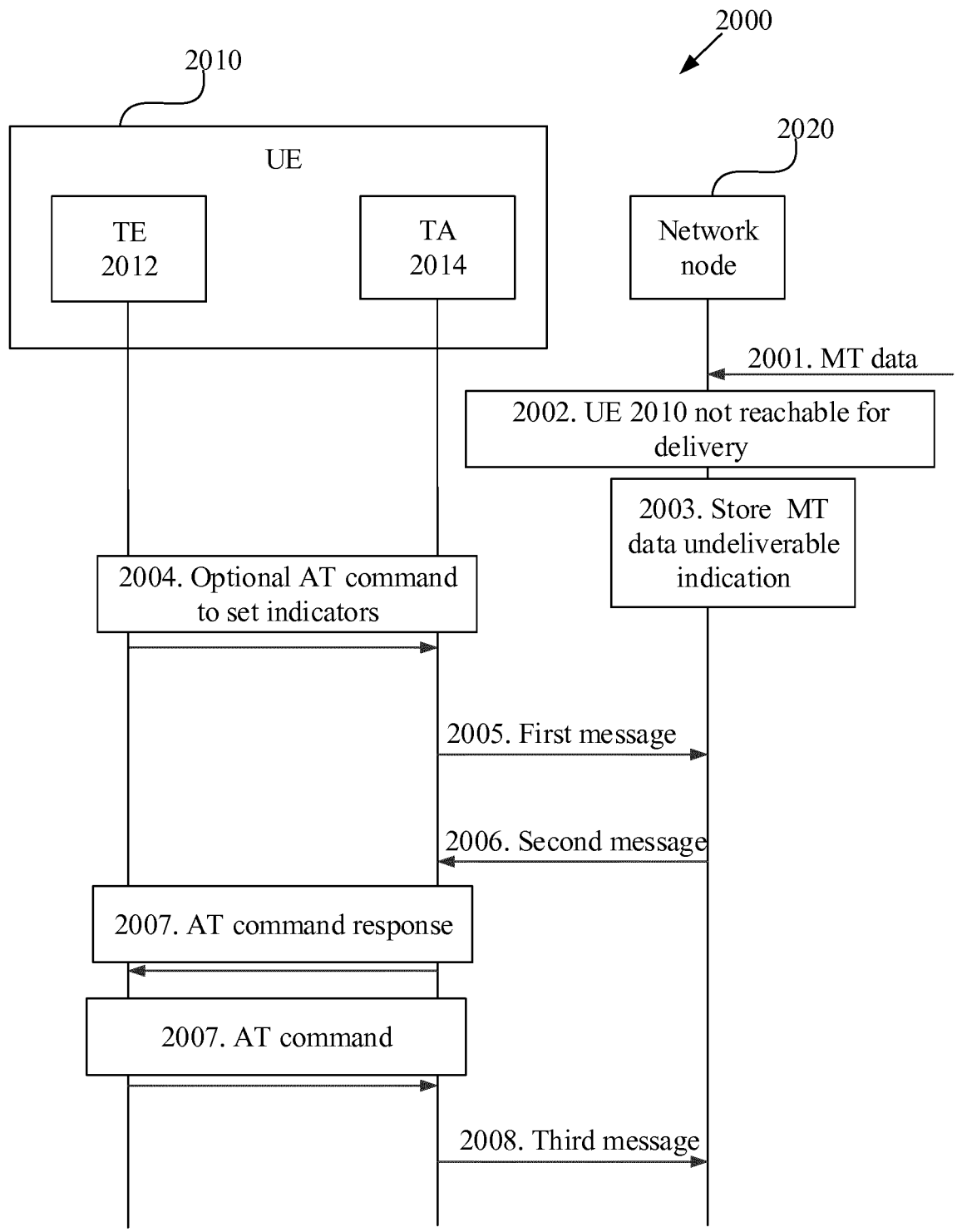
FIG. 20 is a flow diagram for MT traffic handling according to an embodiment of the disclosure.

In an embodiment, one or more of the foregoing embodiments may be combined to enhance battery life of a UE. In this embodiment, with respect to the FIG. 20, one such possible combination of embodiments including optional enhancements is discussed, and could equally be applicable to the other possible combinations of different embodiments described herein. As shown in FIG. 20, a flow diagram 2000 may be implemented between the UE 2010 and a network node 2020. A TA 2014 and a TE 2012 are integrated into the UE 2010. The network node 2020 may include a network node such as MME or SGSN.

Step 2001: The network node 2020 may receive MT data. The received MT data may include an SMS, an MT PDU, or a control message indicating that the MT data is waiting. The message may contain the type/subtype of MT data.

Step 2002: The network node 2020 may attempt to contact the UE 2010 and may be unsuccessful. The UE 2010 may be in PSM deep sleep and therefore, the UE 2010 may not be reachable by the network node 2020.

Step 2003: The network node 2020 may store an indication indicating that the MT data is waiting. The indication may also include type of MT data such as, SMS, MT PDU, etc. and/or sub-type of MT data such as, Application, Operator Message, or User message. Ways of determining the sub-type of data have been explained elsewhere within this application.

Step 2004: The TE 2012 may use AT commands (as discussed previously), using the TA 2014 to include optional indicators, such as "only needing MO sessions," "MMOT traffic will be supported," etc. in the UE 2010 messages sent to the network nodes.

Step 2005: The UE 2010 may send a first message to the network node 2020. The first message optionally may include a user identity corresponding to the UE 2010. In an embodiment, the first message may include a Service Request, Attach request, an RAU request, a TAU request, REGISTER and/or a LAU request. Other types of requests may be included in the first message as necessary.

Step 2006: The network node 2020 may determine if there is any data (i.e., downlink data such as SMS or MT PDU) waiting to be delivered to the UE 2010 and the network node 2020 may send a second message including an indication indicating data availability to the UE 2010.

Step 2007: The TA 2014 may send to the TE 2012 data that was received in step 2006. Upon receipt of the data from the TA 2014, the TE 2012 may determine if the UE should transition to PSM deep sleep or honor the active time timer T3324.

Step 2008: The UE 2010 may send to the network node 2020 a third message indicating the Detachment of the UE 2010 from the network at the expiration of the active time timer T3324 or the UE is entering PSM deep sleep mode.

FIGS. 21A, 21B, 21C, 21D, 21E, and 21F illustrate an exemplary implementation 2100 of an embodiment of the disclosure. The implementation 2100 corresponds to an implementation specified by 3GPP TS 24.301, with changes proposed herein denoted by underlined text. The implementation is a possible solution out of many to implement the embodiments described herein.

Figure 22:
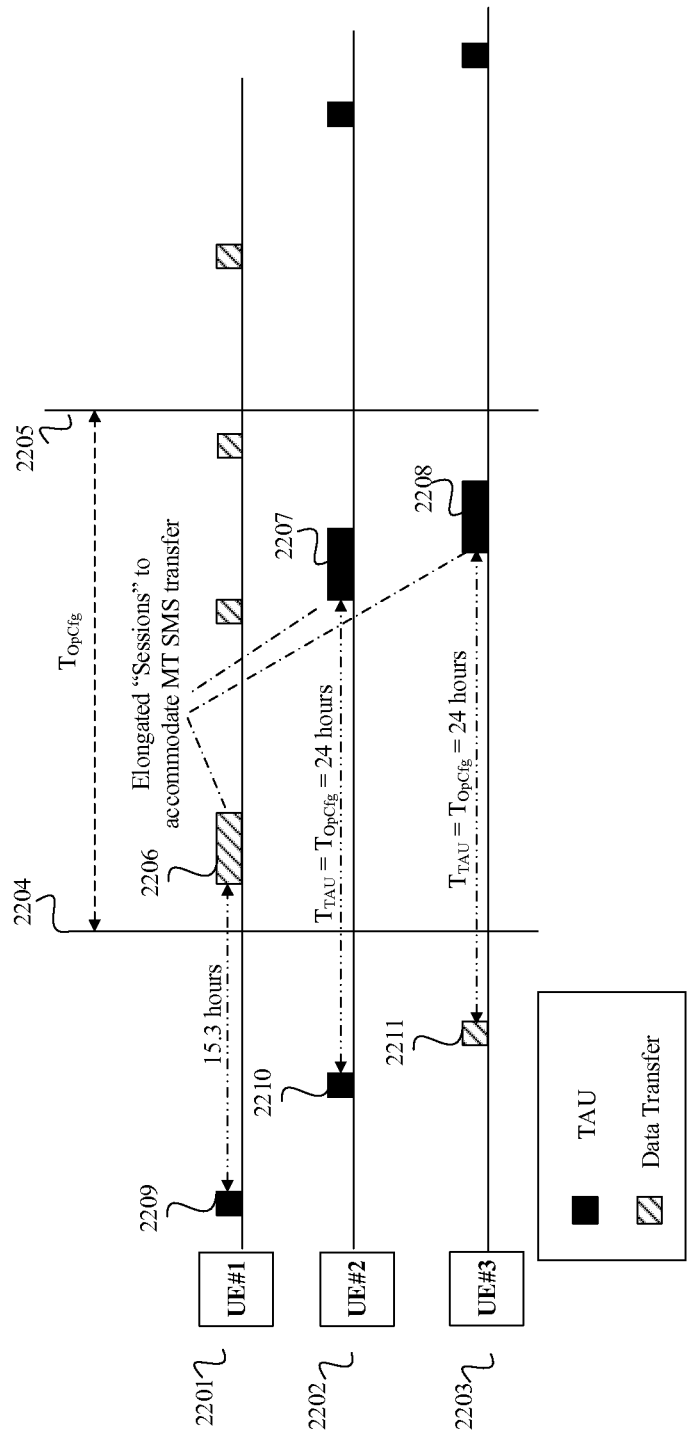
FIG. 22 is a diagram of extended Data Transfer sessions and TAU sessions according to an embodiment of the disclosure.
Figure 23A:
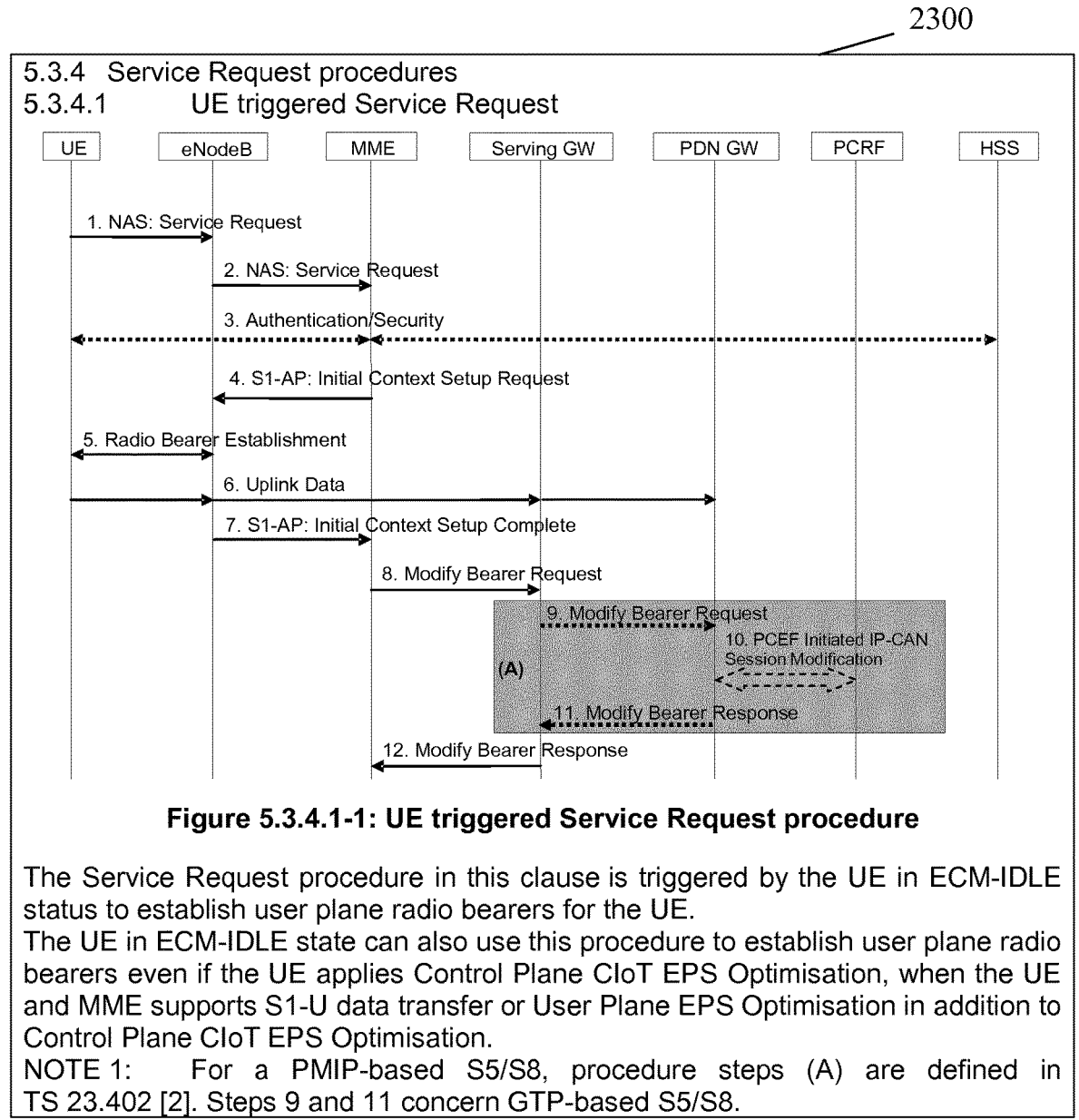

FIG. 22 is a diagram of extended Data Transfer sessions and TAU sessions according to an embodiment of the disclosure. The Data Transfer sessions and the TAU sessions are extended as needed according to whether a "Connection Maintenance Indication" is set at a network node. In addition Timer values as specified elsewhere in this application maybe also sent.

In an embodiment, the operator may need to be able to configure UEs within a required maximum latency (designated as TOpCfg). The operator may be aware that the UEs will access the network at least every periodic TAU timer. In this embodiment, the periodic TAU timer may be designated as $T_{TAU}$ seconds. The operator may set $T_{TAU}$ to be less than or equal to $T_{OpCfg}$. If the operator requires that all UEs be updated within 24 hours (i.e., $T_{OpCfg}$=24 hours), the operator may set $T_{TAU}$ to be 24 hours or less. Hence, the operator may transfer configuration data to the UEs when the UEs access the network according to newly set $T_{TAU}$. The RRC connection may be held longer for purposes of operator generated MT traffic delivery, either as part of a "TAU session" or as a part of a "Data Transfer session."

FIG. 22 includes illustrative examples of three UEs (designated as UE #1, E #2 and UE #3) and three traces 2201, 2202 and 2203. As shown in FIG. 22, UE #1 may follow the trace 2201 including, from left to right, a TAU session 2209 and subsequent series of data transfer (i.e., MO data) sessions 2206, the UE #2 may follow the trace 2202 including, from left to right, a series of TAU sessions 2210 and 2207, and the UE #3 may follow the trace 2203 including, from left to right, a data transfer session 2211 and subsequent series of TAU sessions 2208. The operator may start the device configuration roll out at time indication 2204 and finishes the device configuration roll out at time indication 2205, with duration between time 2204 and time 2205 being $T_{OpCfg}$.

In first trace 2201, the first data transfer event 2206 occurs after indication 2204 and before indication 2205. Therefore, operator configuration for UE #1 may be triggered during the first data transfer session 2206 and the session 2206 is extended to facilitate operator configuration data delivery. Similarly, as indicated in FIG. 22, the first TAU sessions 2207 and 2208 of UE #2 and UE #3 that occur within the $T_{OpCfg}$ window may be extended.

In an embodiment, controlling a duration of a data transfer session may include two options, at User Plane Optimization and at Control Plane Optimization. In an embodiment, the regular User Plane and User Plane Optimization may include the following steps.

At step 1, a UE may request from a network node an active time timer value to be set to zero by sending a first message.

At step 2, the network node may grant the active time timer value set to zero and may send a second message including the active time timer to the UE.

At step 3a, for the regular User Plane connectivity, the UE may send a Service Request to the network node.

At step 3b, for the User Plane Optimization, the UE may send RRC Connection Resume to an access node (such as eNB), which causes the access node to send a message e,g, S1-AP UE CONTEXT RESUME REQUEST to the network node.

At step 4, the network node may detect whether any or all of the following S1 parameters: a Connection Maintenance Indication is set, if any optional timers need to be included, the type of MT data waiting. The access node is informed by e.g. extending an existing field or a new field in the message e.g. S1-AP INITIAL CONTEXT SETUP REQUEST or S1-AP UE CONTEXT RESUME (i.e. for User Plane Optimization) (equivalent 5G messages maybe also extended) whether the Connection Maintenance Indication is set and hence whether or not the access node needs to hold the RRC connection for longer time period.

At step 5, the UE may send an Access Stratum RAI to the access node at the end of the data transfer session.

If the access node was informed during the S1-AP INITIAL CONTEXT SETUP REQUEST or S1-AP UE CON- TEXT RESUME that there is no MT data waiting (e.g. operator configuration data) then the access node may release the RRC connection.

If the access node was informed during the S1-AP INITIAL CONTEXT SETUP REQUEST or S1-AP UE CONTEXT RESUME that there is MT data waiting, then the access node may hold the RRC connection for a pre-configured time period despite having received the RAI from the UE. Or it may hold the connection for period of timer that has been identified by the included timer or if the subtype of MT data was included hold the connection for the period of time for that sub-type of MT data.

The pre-configured time period may be defined either by the access node or the network node (e.g. MME, SGSN, AMF, SMF etc.) that sent the S1-AP messages. When the time period is received from the network node, the timer could be in a new or existing IE. The timer value maybe set per other embodiments in this application e.g table 3.

FIGS. 23A, 23B, 23C, 23D, 23E, 23F, and 23G illustrate an exemplary implementation 2300 of an embodiment of the disclosure. The implementation 2300 corresponds to an implementation specified by 3GPP TS 36.413, with changes proposed herein denoted by underlined text. The implementation is a possible solution out of many to implement the embodiments described herein.

In an embodiment, controlling the duration of data transfer session in Control Plane Optimization may include the following steps.

At step 1, the UE may request the network node to set the active time timer value to be zero.

At step 2, the network node may grant the requested active time timer with value set to zero. In this way there may be no longer an idle mode period where the UE is required to listen for paging.

At step 3, when a MO Data over NAS message arrives at the network node, the network node may detect whether a Connection Maintenance Indication is set.

At step 4a, if the Connection Maintenance Indication is set, then the network node may delay releasing the S1 connection until the pending MT traffic is delivered.

At step 4b, if the Connection Maintenance Indication is not set, the network node may trigger releasing the S1and RRC connections as soon as the MO data transfer session is completed and according to the UE provided NAS Release Assistance Indicator.

In an embodiment, controlling a duration of TAU session may include the following steps.

At step 1, the network node may inform the access node when the connection needs to be held (e.g., when the Connection Maintenance Indication is set).

At step 2, when receiving a TAU REQUEST message, the network node may detect whether the Connection Maintenance Indication is set.

At step 3a, the network node may set a new field in the S1-AP DOWNLINK NAS TRANSPORT message (e.g. NAS downlink container message) carrying the TAU ACCEPT to inform the access node that the RRC signaling connection shall be kept for a longer period if the Connection Maintenance Indication is set.

At step 3b, the network node may set the new field to indicate that the access node should release the RRC connection when the TAU communication is complete if Connection Maintenance Indication is not set.

Similar to the case of TAU messaging, in an Attach message a new field indicating "hold the RRC connection" may be included in S1-AP INITIAL UE CONTEXT SETUP REQUEST, where the Connection Maintenance Indication may be an indication indicating that the MT traffic is available for the UE. Furthermore, even though the foregoing embodiments use 4G terms, the functionality is equally applicable to 5G system, where by S1-AP INITIAL CONTEXT (RESUME, REQUEST) may be replaced with either Nsmf_PDUSession_ReleaseSMContext response, N2 SM Resource Release request or N1 SM container.

FIGS. 24A and 24B illustrate an exemplary implementation 2400 of an embodiment of the disclosure. The implementation 2400 corresponds to an implementation specified by 3GPP TS 36.413, with changes proposed herein denoted by underlined text. The implementation is a possible solution out of many to implement the embodiments described herein.

The various methods or operations described herein may be implemented in a 3GPP 4G network and any equivalent components in a 3GPP 5G network. Further, the embodiments described herein may be combined in whole or in part.

Figure 25:
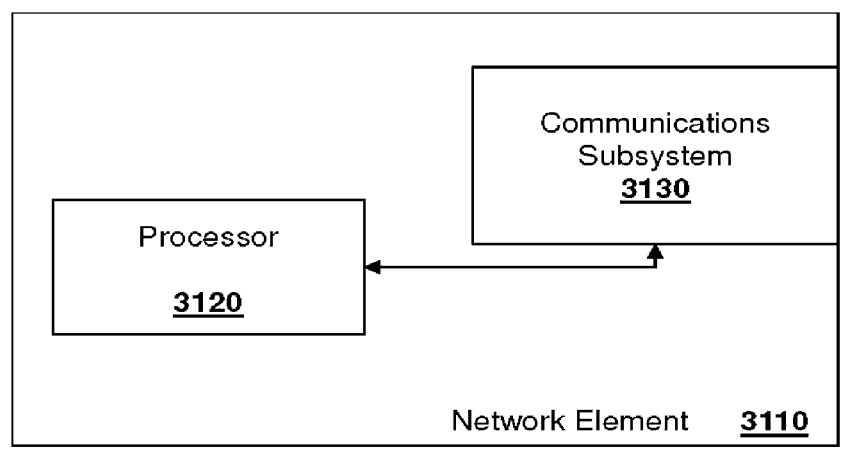
FIG. 25 illustrates a block diagram of a network element according to an embodiment of the disclosure.

The various methods or operations described herein may be implemented by a network element. An example network element is shown with regard to FIG. 25. In FIG. 25, network element 3110 includes a processor 3120 and a communications subsystem 3130, where the processor 3120 and communications subsystem 3130 cooperate to perform the methods or operations previously described.

Figure 26:
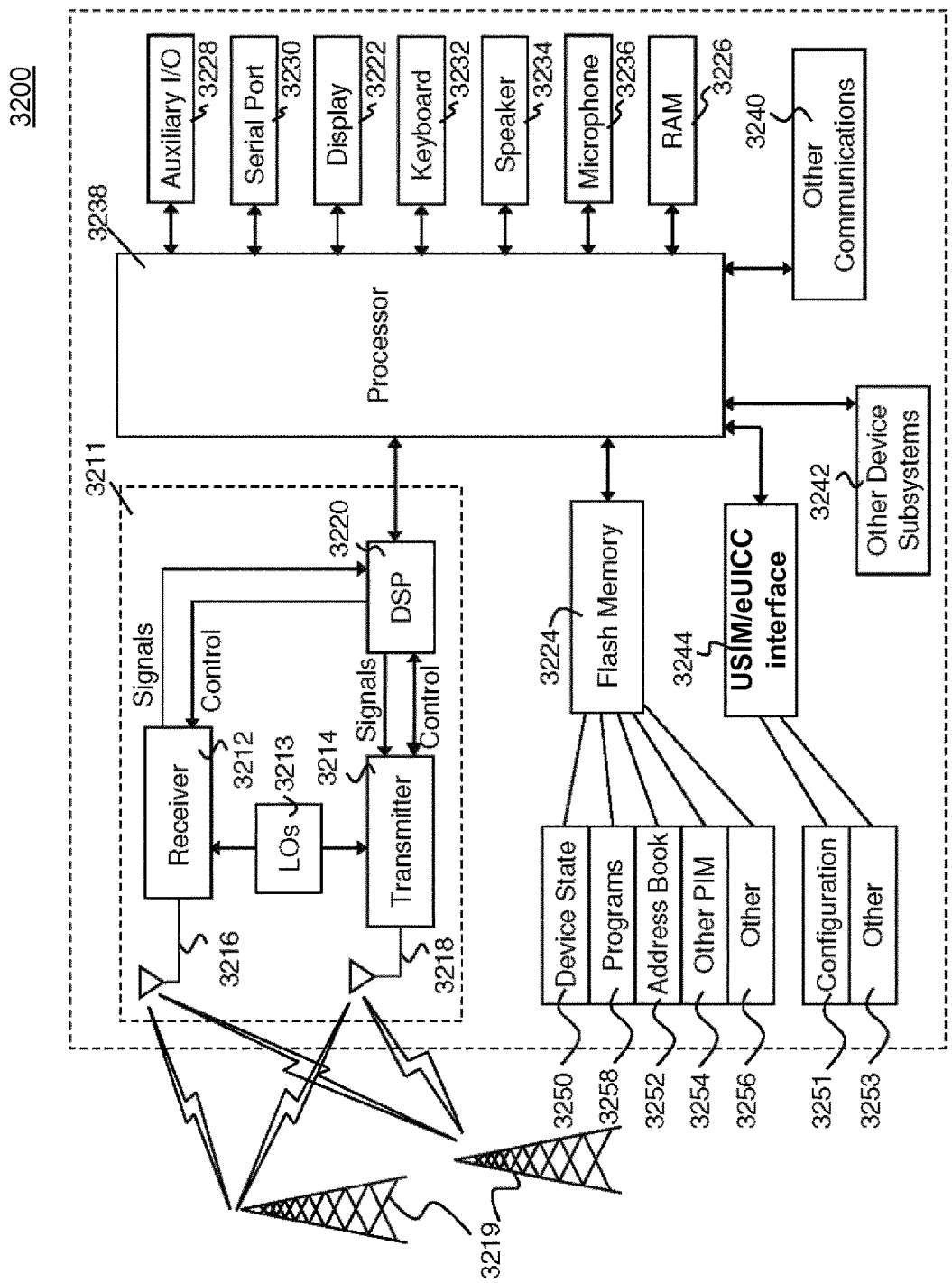
FIG. 26 is a block diagram of a UE according to an embodiment of the disclosure.

Further, the various methods or operations described herein may be implemented by a communications device (e.g., UEs, network nodes, TE, etc.). An example of a communications device is described below with regard to FIG. 26. The communications device 3200 may comprise a two-way wireless communication device having voice and data communication capabilities. In some embodiments, voice communication capabilities are optional. The communications device 3200 may have the capability to communicate with other computer systems on the Internet. Depending on the exact functionality provided, the communications device 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the communications device 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network 3219 in which the communications device 3200 is intended to operate.

Network access may also vary depending upon the type of network 3219. In some networks, network access is associated with a subscriber or user of the communications device 3200. The communications device 3200 may use a USIM or eUICC in order to operate on a network. The USIM/eUICC interface 3244 is typically similar to a card slot into which a USIM/eUICC card may be inserted. The USIM/eUICC card may have memory and may hold many key configurations 3251 and other information 3253, such as identification and subscriber-related information.

When network registration or activation procedures have been completed, the communications device 3200 may send and receive communication signals over the network 3219. As illustrated, the network 3219 may comprise multiple base stations communicating with the communications device 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The communications device 3200 generally includes a processor 3238 which controls the overall operation of the device. Communication functions, including data and voice communications, are performed through communication subsystem 3211 in cooperation with the processor 3238. Processor 3238 also interacts with further device subsystems such as the display 3222, flash memory 3224, random access memory (RAM) 3226, auxiliary input/output (I/O) subsystems 3228, serial port 3230, one or more user interfaces such as keyboards or keypads 3232, speaker 3234, microphone 3236, one or more other communication subsystems 3240 such as a short-range communications subsystem, and any other device subsystems generally designated as 3242. While the other communication subsystems 3240 and device subsystems 3242 are depicted as separate components in FIG. 26, it is to be understood that subsystems 3240 and device subsystems 3242 (or parts thereof) may be integrated as a single component. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be constituted by different areas for both computer programs 3258 and program data storage 3250, 3252, 3254, and 3256. These different storage types indicate that each program may allocate a portion of flash memory 3224 for their own data storage use. Processor 3238, in addition to its operating system functions, may enable execution of software applications on the communications device 3200. A predetermined set of applications that control basic operations, including at least data and voice communication applications for example, may typically be installed on the communications device 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

Software applications may be loaded onto the communications device 3200 through the network 3219, an auxiliary I/O subsystem 3228, serial port 3230, short-range communications subsystem(s) 3240, or any other suitable subsystem(s) 3242, and installed by a user in the RAM 3226 or a non-volatile store (not shown) for execution by the processor 3238. Such flexibility in application installation may increase the functionality of the communications device 3200 and may provide enhanced on-device functions, communication-related functions, or both. For example, secure communication applications may enable electronic commerce functions and other such financial transactions to be performed using the communications device 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

For voice communications, overall operation of the communications device 3200 is similar, except that received signals may typically be output to a speaker 3234 and signals for transmission may be generated by a microphone 3236. Alternative voice or audio I/O subsystems, such as a voice message recording subsystem, may also be implemented on the communications device 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the communications device 3200 by providing for information or software downloads to the communications device 3200 other than through a wireless communication network 3219. The alternate download path may, for example, be used to load an encryption key onto the communications device 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the communications device 3200 and different systems or devices, which need not necessarily be similar devices. For example, one or more other subsystems 3240 may include an infrared device and associated circuits and components or a Bluetooth™ communication module to provide for communication with similarly enabled systems and devices. Subsystems 3240 may further include non-cellular communications such as WI-FI, WiMAX, near field communication (NFC), BLUETOOTH, ProSe (Proximity Services) (e.g., sidelink, PC5, D2D, etc.) and/or radio frequency identification (RFID). The other communications subsystem(s) 3240 and/or device subsystem(s) 3242 may also be used to communicate with auxiliary devices such as tablet displays, keyboards or projectors.

Figure 27:
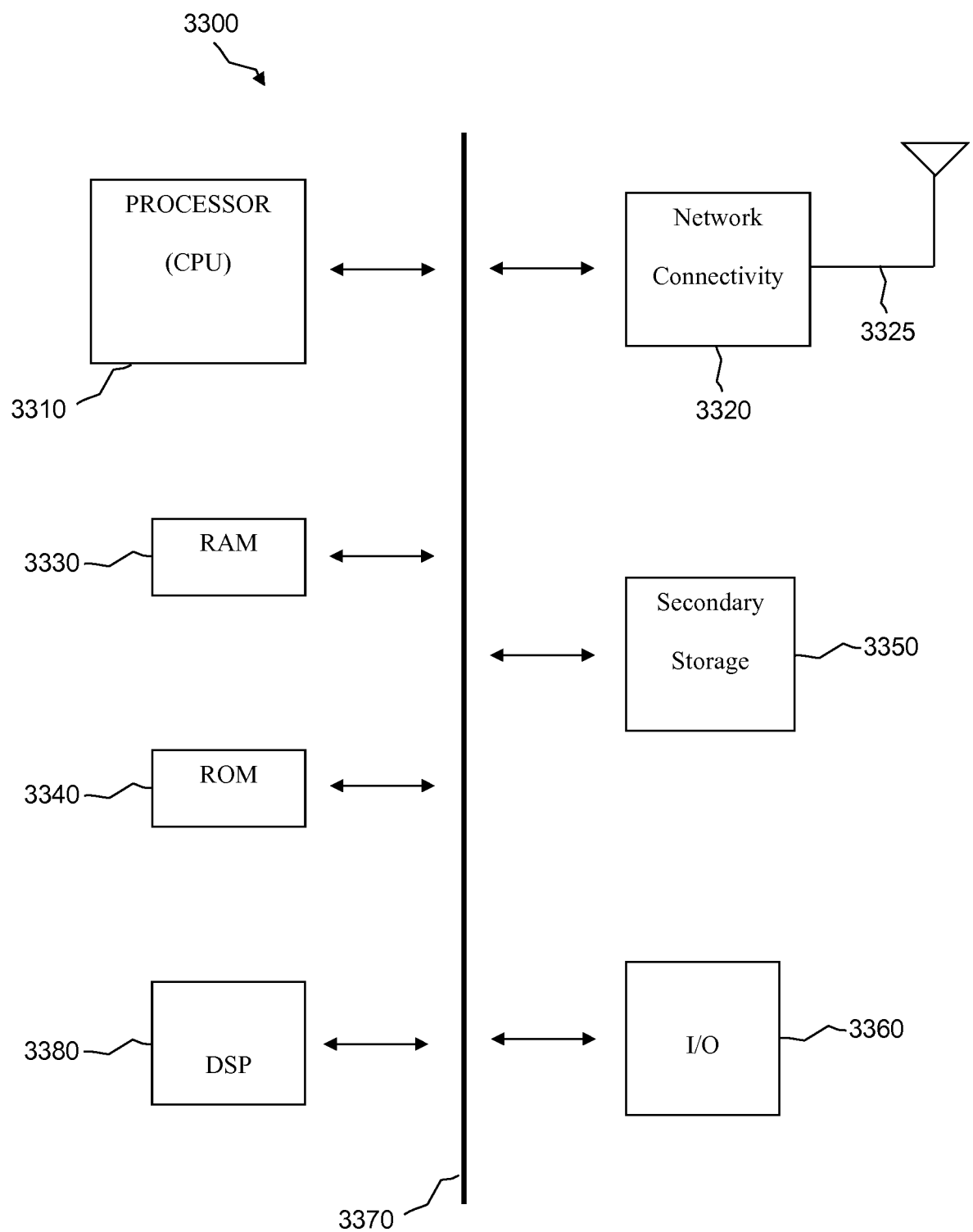
FIG. 27 illustrates an example processor and related components suitable for implementing the several embodiments of the present disclosure.

The communications device 3200 and other components described above might include a processing component that is capable of executing instructions related to the actions described above. FIG. 27 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, wireless local area network (WLAN) devices, radio transceiver devices such as code division multiple access (CDMA) devices, GSM radio transceiver devices, universal mobile telecommunications system (UMTS) radio transceiver devices, LTE radio transceiver devices, new generation radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method in a network node is provided. The method may comprise receiving, by a network node from the UE, a first message comprising an active time request and a UE identifier of the UE; generating, by the network node, a second message comprising an active time response determined based on whether mobile terminated (MT) data is awaiting transmission to the UE; and sending, by the network node, the second message.

In an embodiment, a method in a user equipment (UE) is provided. The method may comprise generating, by a UE, a first message comprising an active time request and a UE identifier of the UE; sending, by the UE, the first message to a network node; receiving, by the UE, a second message from the network node comprising an active time response; determining, by the UE, an active time value based upon the active time response; setting, by the UE, an active time timer to the active time value; sending, by the UE, mobile originated (MO) traffic; and entering, by the UE, a power saving mode (PSM) after expiration of the active time timer.

In an embodiment, a network node is provided. The network node may comprise a memory; and a processor coupled to the memory. The processor may be configured to receive, from a user equipment (UE), a first message comprising an active time request and a UE identifier of the UE; generate a second message comprising an active time response determined based on whether mobile terminated (MT) data is awaiting transmission to the UE; and send the second message.

In an embodiment a user equipment (UE) is provided. The UE may comprise a memory; and a processor coupled to the memory. The processor may be configured to generate a first message comprising an active time request and a UE identifier of the UE; send the first message to a network node; receive a second message from the network node comprising an active time response; determine an active time value based upon the active time response; set an active time timer to the active time value; send mobile originated (MO) traffic; and enter a power saving mode (PSM) after expiration of the active time timer.

The following are incorporated herein by reference for all purposes:, 3GPP TS23.682, 3GPP TS 23.301, 3GPP TS 24.008, 3GPP TS 27.007, 3GPP TS 24.301, 3GPP TS 23.401, 3GPP TS 36.413, and 3GPP TS 36.331.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method in a user equipment (UE), the method comprising:
   generating, by a UE, a first message comprising an active time request and a UE identifier of the UE;
   sending, by the UE, the first message to a network node;
   receiving, by the UE, a second message from the network node comprising an active time response;
   determining, by the UE, an active time value based upon the active time response;
   setting, by the UE, an active time timer to the active time value;
   sending, by the UE, mobile originated (MO) traffic; and
   entering, by the UE, a power saving mode (PSM) after expiration of the active time timer, wherein the active time request comprises a mostly MO traffic (MMOT) support flag.

2. The method of claim 1, wherein the active time request comprises a request to set the active time value to zero, and wherein the active time response comprises the active time value set to zero.

3. The method of claim 1, wherein the active time request comprises a request to set the active time value, wherein the active time response comprises a message waiting flag, and wherein the method further comprises:
   setting the active time value to zero when the message waiting flag is set to false; and
   setting the active time value to an active time value included in the active time response when the message waiting flag is set to true.

4. The method of claim 1, wherein the active time response comprises an (MMOT) support flag, and wherein the method further comprises setting the active time value to zero for a predetermined time when the MMOT support flag is set to true, wherein the predetermined time is stored at the UE or received from the network node.

5. The method of claim 1, further comprising starting, by the UE, the active time timer when the UE begins sending the MO traffic.

6. The method of claim 1, wherein the second message comprises an S1 release comprising a PSM state transition indicator, and wherein the method further comprises:
   setting the active time value to zero when the PSM state transition indicator indicates a PSM deep sleep; and
   setting the active time value to an active time value included in the active time response when the PSM state transition indicator indicates a PSM active time.

7. The method of claim 1, further comprising starting, by the UE, the active time timer when the UE receives a tracking area update accept message.

8. The method of claim 1, wherein the active time request comprises a session initiation preference, wherein the session initiation preference comprises one or more of a mobile session origination only preference or a MMOT traffic preference.

9. A user equipment (UE) comprising:
   a memory; and
   a processor coupled to the memory, the processor configured to:
      generate a first message comprising an active time request and a UE identifier of the UE;
      send the first message to a network node;
      receive a second message from the network node comprising an active time response;
      determine an active time value based upon the active time response;
      set an active time timer to the active time value;
      send mobile originated (MO) traffic; and
      enter a power saving mode (PSM) after expiration of the active time timer,
   wherein the active time request comprises a mostly MO traffic (MMOT) support flag.

10. The UE of claim 9, wherein the active time request comprises a request to set the active time value to zero, and wherein the active time response comprises the active time value set to zero.

11. The UE of claim 9, wherein the active time request comprises a request to set the active time value, wherein the active time response comprises a message waiting flag, and wherein the processor is further configured to:
   set the active time value to zero when the message waiting flag is set to false; and
   set the active time value to an active time value included in the active time response when the message waiting flag is set to true.

12. The UE of claim 9, wherein the active time response comprises an (MMOT) support flag, and wherein the processor is further configured to set the active time value to zero for a predetermined time when the MMOT support flag is set to true, wherein the predetermined time is stored at the UE or received from the network node.

13. The UE of claim 9, wherein the processor is further configured to start the active time timer when the UE begins sending the MO traffic.

14. The UE of claim 9, wherein the second message comprises an S1 release comprising a PSM state transition indicator, and wherein the processor is further configured to:
   set the active time value to zero when the PSM state transition indicator indicates a PSM deep sleep; and
   set the active time value to an active time value included in the active time response when the PSM state transition indicator indicates a PSM active time.

15. The UE of claim 9, wherein the processor is further configured to start the active time timer when the UE receives a tracking area update accept message.

16. The UE of claim 9, wherein the active time request comprises a session initiation preference, wherein the session initiation preference comprises one or more of a mobile session origination only preference or a MMOT traffic preference.

17. A non-transitory computer program product comprising instructions which, when executed by a processor of a user equipment (UE), cause the UE to:
   generate a first message comprising an active time request and a UE identifier of the UE;
   send the first message to a network node;
   receive a second message from the network node comprising an active time response;

determine an active time value based upon the active time response;
set an active time timer to the active time value;
send mobile originated (MO) traffic; and
enter a power saving mode (PSM) after expiration of the active time timer, wherein the active time request comprises a mostly MO traffic (MMOT) support flag.

18. The non-transitory computer program product of claim 17, wherein the active time request comprises a request to set the active time value to zero, and wherein the active time response comprises the active time value set to zero.

* * * * *